(12) United States Patent
Kalyani et al.

(10) Patent No.: US 8,761,308 B2
(45) Date of Patent: Jun. 24, 2014

(54) ESTIMATION OF CHANNEL IMPULSE RESPONSE IN A COMMUNICATION RECEIVER

(75) Inventors: Sheetal Kalyani, Chennai (IN); Ganesh Venkatraman, Chennai (IN)

(73) Assignee: Centre of Excellence In Wireless Technology, Chennai (IN)

( * ) Notice: Subject to any disclaimer, the term of this patent is extended or adjusted under 35 U.S.C. 154(b) by 113 days.

(21) Appl. No.: 13/519,320

(22) PCT Filed: Dec. 29, 2009

(86) PCT No.: PCT/IN2009/000744
§ 371 (c)(1),
(2), (4) Date: Jun. 26, 2012

(87) PCT Pub. No.: WO2011/080748
PCT Pub. Date: Jul. 7, 2011

(65) Prior Publication Data
US 2012/0307939 A1    Dec. 6, 2012

(51) Int. Cl.
*H03K 9/00*    (2006.01)

(52) U.S. Cl.
USPC .......................................................... 375/316

(58) Field of Classification Search
USPC ................................................... 375/260, 316
See application file for complete search history.

(56) References Cited

U.S. PATENT DOCUMENTS

2007/0127588 A1   6/2007  Kim
2007/0243837 A1  10/2007  Krishnamoorthi et al.
2008/0102873 A1   5/2008  Kumar

*Primary Examiner* — Kevin Kim
(74) *Attorney, Agent, or Firm* — Rahman LLC

(57) ABSTRACT

Embodiments herein provide using extreme value theory (EVT) as a diagnostic to decide which taps are significant. In the low SINR scenario, embodiments herein also provide the following options; i) Fix the model order to a finite value smaller than the model order assumed for the initial CIR estimate. In the case of OFDM based systems, the model order of the CIR is fixed to a value much smaller that the cyclic prefix length. ii) Use the EVT based method to detect significant tap locations and only keep those tap locations such that the CIR length is again restricted to a value smaller than the model order of the initial channel estimate.

45 Claims, 18 Drawing Sheets

Odd symbols | Even symbols

Symbol Instants

ESTIMATION OF CHANNEL IMPULSE RESPONSE IN A COMMUNICATION RECEIVER

TECHNICAL FIELD

The embodiments herein relate to communication systems and, more particularly, to channel impulse response estimates in communication systems.

BACKGROUND

In the case of OFDM systems which employ wideband pilot signals, an initial coarse estimate of the CIR is obtained using a regularized version of the MLS algorithm. Here the subscript j denotes the $j^{th}$ receive antenna, n denotes the $n^{th}$ OFDM symbol. For example, consider a system with single transmit antenna and multiple receive antenna. After FFT of the received OFDM symbol at the receiver, $b_{j,n}$, the received data at pilot locations at the $n^{th}$ OFDM symbol is given by $$b_{j,n} = A_{n,L}h_{j,n} + N_{j,n} + \sum_{i=1}^{M} A_{n,L,i}h_{j,n,i} \quad (1)$$

where $h_{j,n}$ is the desired CIR at the $j^{th}$ receive antenna in the $n^{th}$ OFDM symbol and $h_{j,n,i}$ is the CIR of the $i^{th}$ interferer. Here $b_{j,n}$ is the received samples (after FFT) at the pilot locations, $A_{n,L}=S_n F_L$ and $A_{n,L,i}=S_{n,i}F_L$ with $S_n$ being a P×P diagonal matrix where the diagonal entries correspond to pilots and/or data for the user and $F_L$ is the DFT matrix of dimension P×L where the columns of the DFT matrix correspond to multipath locations of $h_{j,n}$ and the rows correspond to pilot positions. Similarly $S_{n,j}$ is a P×P diagonal matrix where the diagonal entries correspond to pilots and/or data of the interfering user. $N_{j,n}$ is a P×1 vector corresponding to thermal noise at the pilot locations. The CIR comprises of L multipath components and has the form $$h_j(k) = \sum_{i=1}^{L} \alpha_i \delta(k-i) \quad (2)$$

where $\alpha_i$ is a zero mean complex Gaussian variable and $\delta(.)$ is the Dirac delta operator. The path delays are assumed to sample spaced however the proposed method can be used even in the case of a non sample spaced model. In the case of a non-sample spaced model, the equivalent sample spaced version is looked at wherein due to leakage the number of non-zero sample spaced taps will be higher than the actual number of non-sample spaced channel taps and a DFT matrix of appropriate dimension is used. Generally L will be much smaller than the cyclic prefix (CP) of length $L_{CP}$.

One of the simplest channel estimation schemes for OFDM system is the modified least squares (MLS) scheme which exploits the fact that the CIR length L is at most equal to the CP length $L_{CP}$. This leads to the following channel estimate given by $$\hat{h}_{j,n} = (A_{n,L_{CP}}^H A_{n,L_{CP}})^{-1} A_{n,L_{CP}}^H b_{j,n} \quad (3)$$

where $A_{n,L_{CP}}=S_n F_{L_{CP}}$ with $F_{L_{CP}}$ corresponding to the DFT matrix of dimension P×$L_{CP}$. In low SINR scenarios, the MLS estimator has a very poor performance due to the effect of noise and interference. The MSE of MLS estimator is approximately equal to $\sigma^2 L_{CP}/P$ where $\sigma^2$ is the variance of sum of interference and noise term at a subcarrier and P is the number of pilots. The MSE value is very high at low SINR, i.e. for example in LTE system with $L_{CP}=80$ and P=100 the corresponding MSE value is $\sigma^2 L_{CP}/P \approx \sigma^2$. Furthermore, in case of MLS, the matrix inverse $(A_{n,L_{CP}}^H A_{n,L_{CP}})^{-1}$ is ill-conditioned due to the presence of guard tones/virtual carriers in the OFDM symbols and hence will lead to a highly smeared CIR estimate in the time-domain.

One way to combat this is to use regularization theory and estimate the CIR as a regularized LS problem. The regularized MLS solution is given by $$\hat{h}_{j,n} = (A_{n,L_{CP}}^H A_{n,L_{CP}} + \gamma I_{L_{CP}})^{-1} A_{n,L_{CP}}^H b_{j,n} \quad (4)$$

While there has been a lot of papers/patents which use diagonal loading/regularization to reduce the ill-conditioned nature of $(A_{n,L_{CP}}^H A_{n,L_{CP}})^{-1}$ most of them suggest a ad-hoc diagonal loading values such as $\gamma=10^{-5}$ or $\gamma \ll 1/P$. If the regularization term $\gamma$ is not chosen properly the time domain MLS estimate still suffers from smearing and it is not possible to apply model order identification and tap detection algorithm to the time domain channel estimate.

One of the most popular model order identification methods is based on AIC/GAIC. While GAIC and AIC based methods are highly efficient they are quite computationally complex and may be difficult to implement in practice.

Let $\{M_k: k=1, 2, \ldots, K\}$ be a set of competing models indexed by $k=1, 2, \ldots, K$. Then the criterion $$AIC(k) = -2 \log L(\hat{\theta}_k) + 2k \quad (7)$$

which is minimized to choose the model $M_k$ over the set of models is called the AIC criterion. $L(\hat{\theta}_k)$ is the likelihood function assuming model order k. Here the term 2k penalizes overfitting while $-2 \log L(\hat{\theta}_k)$ penalizes underfitting. It is well known that as the number of observations tends to infinity the probability of overfitting tends to a constant greater than zero while the probability of underfitting tends to zero for the AIC. The non-zero overfitting probability is clue to fact that the term 2k which penalizes overfitting is small.

The following generalized information criterion (GAIC) given by $$GAIC(k) = -2 \log L(\hat{\theta}_k) + vk \quad (8)$$

may outperform AIC if v>2. However, there is no clear guideline for choosing v and no expression given for the best v. Based on empirical studies it is believed that values in the interval $v \in [2, 6]$ gives the best performance.

The Bayesian information criterion selects the order that minimizes $$BIC(k) = -2 \log L(\hat{\theta}_k) + k \ln N \quad (9)$$

While the GAIC criterion and other information criterion such as Bayesian Information Criterion (BIC) are very accurate in finding the model order and channel tap position at moderate to high SINR they involve a high computational load. For example, in case of a CP of length $L_{CP}$ to find the model order (7) will have to be computed $L_{CP}$ times. Then to find the sparsity information, the last tap (estimated model order) is removed and then again finds the new the model order. If the estimated model order (last tap position) was l then again one has to compute (7) l times to find the new model order and hence find the position of the second last tap. This procedure continues till one obtains all the significant taps. The complexity of such a process depends on the number of taps and the tap locations and the number of estimated taps. Since multiple passes of the GAIC algorithm have to be done, it is time consuming and complex.

One simple solution in case of very low SINR regime, i.e., cell edge scenario is to simply assume that model order is small (since most model order methods fail to find the actual model order and the MLS solution is also extremely poor, as it implicitly assumes a highly overparametrized model by assuming that channel length is $L_{CP}$) and hard fix the model order to number say $gL_{CP}$ with g<1 based on the rough knowledge the receiver has of the channel selectivity. It can be shown through simulations that such an approach works very well for SINRs below 2 dB since in such cases even GAIC/ AIC are not able to find the correct taps locations as the high interference and noise swamp out the channel taps. In fact in most cases GAIC ends up with a model order of 1 or zero, i.e. it barely manages to locate the LOS tap and assumes that there are no other significant taps. Therefore instead of even trying to apply model order techniques one could simply assume a fixed number (sufficiently small) of taps. It can be shown that assuming that number of non-zero taps to be eight when the CP length $L_{CP}$ is 80 works very well for all the channel models defined for LTE, i.e. PEDA, EPEDA, PEDB, EVA and ETU tabulated in Table 1.

This method is called the fixed model order method and let the fixed value for model order be M. Now the complexity of the fixed model order is even lesser than the computational complexity of the baseline MLS algorithm since $M \ll L_{CP}$.

While the fixed model order method work very well compared to the baseline MLS method and the GAIC method as long as SINR is low, for example, SINR<2 dB, its performance will gradually degrade as the SINR increases in comparison to other model order method since at higher SINRs a good model order method can find out the actual taps locations and hard fixing the model order would not be a good idea.

SUMMARY

Embodiments herein disclose a method and a receiver for estimating the Channel Impulse Response (CIR) for a received signal in a communication system, the method comprising steps of computing the coarse channel estimate at pilot locations in the received signal; computing the channel power estimate using the computed coarse channel estimate; estimating sum of interference power and thermal noise variance; computing the optimal regularization term using the sum of interference power, thermal noise variance and the channel power estimate; computing the optimally regularized Modified Least Square (MLS) estimate using the optimal regularization term, which may be based on Bayesian regularization theory; computing variance of noise in the regularized MLS estimate; identifying probable multipath tap locations using model order estimation methods in the received signal using the MLS estimate and the variance of the noise in the regularized MLS estimate; classifying the probable multipath locations into significant multipath locations and locations with noise using outlier detection theory or using Extreme Value Theory (EVT); and estimating the CIR using the knowledge of the detected significant multipath locations. The receiver may be an Orthogonal Frequency Division Multiplexed (OFDM) based receiver, with at least one receiving antenna. The sum of interference power and thermal noise variance is estimated using at least one of mean value of the channel estimate; trimmed mean value of the channel estimate; median value of the channel estimate; or a combination of mean, trimmed mean and median values. The variance of noise in the MLS estimate is computed using at least one of theoretical variance value; median variance value; trimmed mean variance value; or a combination of theoretical variance, median variance and trimmed mean variance values. The probable multipath locations are classified into multipath locations and locations with noise using a function of the probability density function (pdf) of the maximum of m iid random variables to distinguish between significant taps and taps which contain only noise, wherein the m iid random variables are noise present in the optimally regularized MLS estimate. In case of the received signal having a low signal to interference ratio, the receiver further performs the steps of fixing a first model order; wherein the first model order is less than an assumed model order used to compute the channel estimate; and retaining tap locations, wherein position of the retained tap locations is less than the first model order. In case of wideband pilots present in the received signal, the receiver further performs the steps of calculating power delay profile from the regularized MLS estimate; and using the power delay profile while designing estimators which use narrowband pilots for other symbols in the same frame. The method as described above may be performed by the receiver iteratively.

Embodiments herein also disclose a method and a receiver for estimating the Channel Impulse Response (CIR) for a received signal in a communication system, the method comprising steps of computing a coarse channel estimate from the received signal; finding a function of noise in the coarse channel estimate; detecting locations of significant taps in the coarse channel estimate using outlier detection theory; treating the significant taps as outliers with respect to the noise values; and estimating the CIR using the knowledge of the detected significant tap locations. The function of noise is one of variance of the noise; dispersion of the noise; or probability density function (pdf) of the noise. The function of noise is calculated using at least one of median variance value of the channel estimate; trimmed mean variance value of the channel estimate; Maximum likelihood estimator of the function of the noise; M estimator of function of the noise; Maximum likelihood estimator of variance of the noise; or Maximum likelihood estimator of dispersion of the noise. In case of wideband pilots present in the received signal, the receiver further performs the steps of calculating power delay profile from the regularized MLS estimate; and using the power delay profile while designing estimators which use narrowband pilots for other symbols in the same frame.

Embodiments further disclose a method and a receiver for estimating the Channel Impulse Response (CIR) for a received signal in a communication system, the method comprising steps of computing a coarse channel estimate for the received signal; finding a function of noise in the coarse channel estimate; detecting locations of significant taps in the coarse channel estimate using Extreme Value Theory (EVT); and estimating the CIR using the knowledge of the detected significant tap locations. The function of noise is at least one of variance of the noise; dispersion of the noise; a function of the tail behaviour of the noise; shape parameter of the noise; parameters defining the pdf of the noise; or parameters defining the pdf of the maximum of m iid realizations of the noise. The function of noise is calculated using at least one of median variance value of the channel estimate; or trimmed mean variance value of the channel estimate; maximum likelihood estimator for the parameters defining probability density function (pdf) of the noise; M estimator for the parameters defining the pdf; maximum likelihood estimator for the parameters defining pdf of the maximum of m iid realizations of the noise; and M estimator for parameters defining the pdf of the maximum of m iid realizations of the noise. The significant taps are detected by applying EVT to distinguish between large values in the coarse channel estimate which are due to noise and interference and those which are due to significant tap locations. Detecting locations of the significant taps in the coarse channel estimate using EVT further comprises steps of computing a function based on Extreme value distribution of noise in the coarse channel estimate; comparing value of the function at each tap location of the coarse channel estimate with respect to a threshold value; and retaining tap locations where value of the function exceeds a threshold value. The cumulative density function of the maxima of m noise values are used to distinguish between significant channel taps and noise, where m is chosen at the receiver and all threshold values are user defined. In case of wideband pilots and narrowband pilots present in the received signal, the receiver further performs the steps of calculating power delay profile from the regularized MLS estimate; and using the power delay profile while designing estimators which use narrowband pilots for other symbols in the same frame.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

Figure 1:
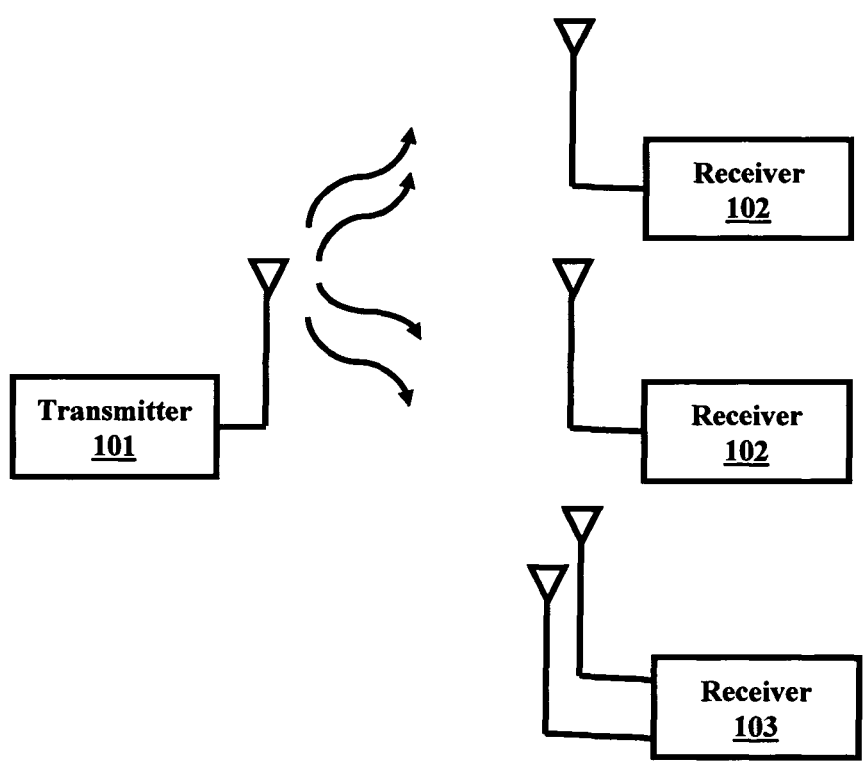
FIG. 1 illustrates a transmitter and receiver system, according to embodiments disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a method for obtaining a Channel Impulse Response (CIR) estimate by further improving the initial coarse estimate obtained from the regularized MLS by detecting the significant tap locations and treating the significant tap locations as outliers with respect to the other tap value which are due to noise and interference. Referring now to the drawings, and more particularly to FIGS. 1 through 18, where similar reference characters denote corresponding features consistently throughout the figures, there are shown embodiments.

Embodiments herein propose to use extreme value theory (EVT) as a diagnostic to decide which taps are significant. In other words a function of the probability density function (pdf) of the maximum of m iid random variables (The random variable under consideration is the noise in regularized MLS estimate) is used to distinguish between significant taps and taps which contain only noise. In the low SINR scenario, embodiments herein also propose the following options; i) Fix the model order to a finite value smaller than the model order assumed for the initial CIR estimate. In the case of OFDM based systems, the model order of the CIR is fixed to a value much smaller that the cyclic prefix length. ii) Use the EVT based method to detect significant tap locations and only keep those tap locations such that the CIR length is again restricted to a value smaller than the model order of the initial channel estimate.

Figure 2:
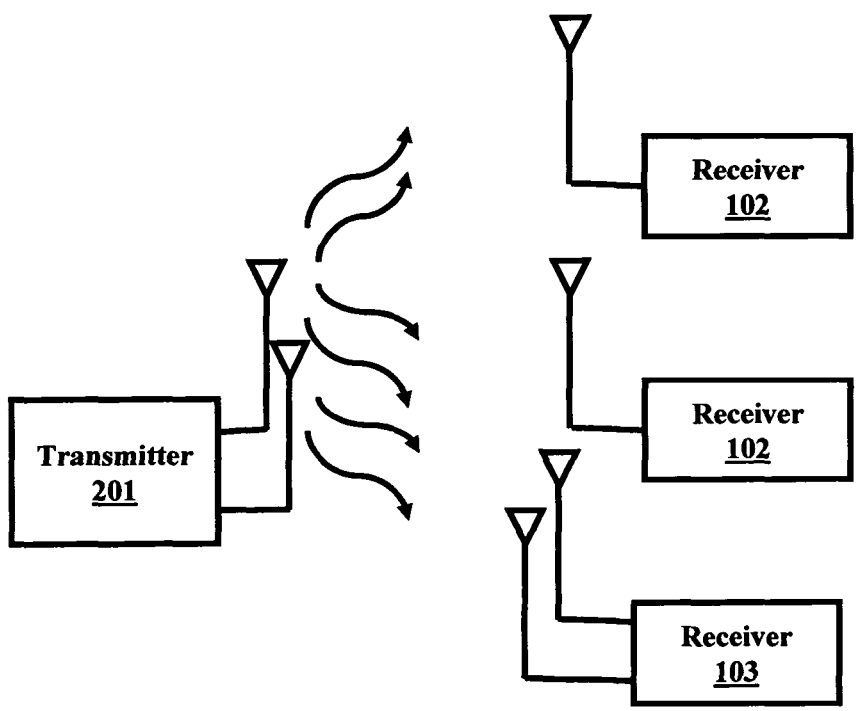
FIG. 2 illustrates a transmitter and receiver system, according to embodiments disclosed herein.

FIGS. 1 and 2 depict a transmitter and receiver system, according to embodiments as disclosed herein. FIG. 1 depicts a transmitter 101 using one antenna transmitting to a plurality of receivers 102, 103. The receivers 102, 103 may have one or more antennas. FIG. 2 depicts a transmitter 201 using two antennas transmitting to a plurality of receivers 102, 103. The receivers 102, 103 may have one or more antennas.

Figure 3:
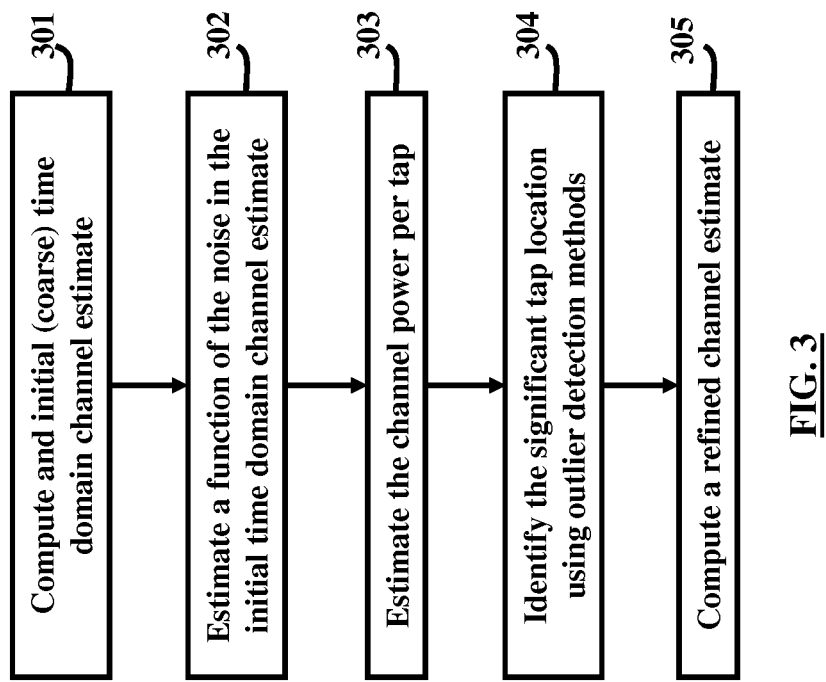
FIG. 3 is a flowchart depicting a method for performing channel estimation, according to embodiments as disclosed herein.

FIG. 3 is a flowchart depicting a method for performing channel estimation, according to embodiments as disclosed herein. An initial (coarse) time domain channel estimate is calculated (301), which is overparametrized compared to the actual channel impulse response. A function of the noise in the initial time domain estimate is then estimated (302). The function may be variance or dispersion of the noise, which can be estimated using either mean, median, trimmed mean or a function of order statistics of the initial time domain estimates. Any suitable function of the noise in the initial time domain may also be estimated herein. The channel power per channel tap is estimated (303). The significant tap locations are identified (304) by comparing the tap value at each tap location against a function of the expected noise in the initial channel estimate by treating significant channel taps as outliers with respect to the noise in the initial channel estimate and employing outlier detection methods. A refined channel estimate is computed (305) which exploits the knowledge of detected tap locations. This refined channel estimate can be computed using the same data else the detected tap location knowledge can be utilized in other frames/symbols. The process as described herein is relevant for channel impulse response estimation in any communications receiver, where the knowledge of the channel tap locations is not known. The various actions in method 300 may be performed in the order presented, in a different order or simultaneously. Further, in some embodiments, some actions listed in FIG. 3 may be omitted.

Figure 4:
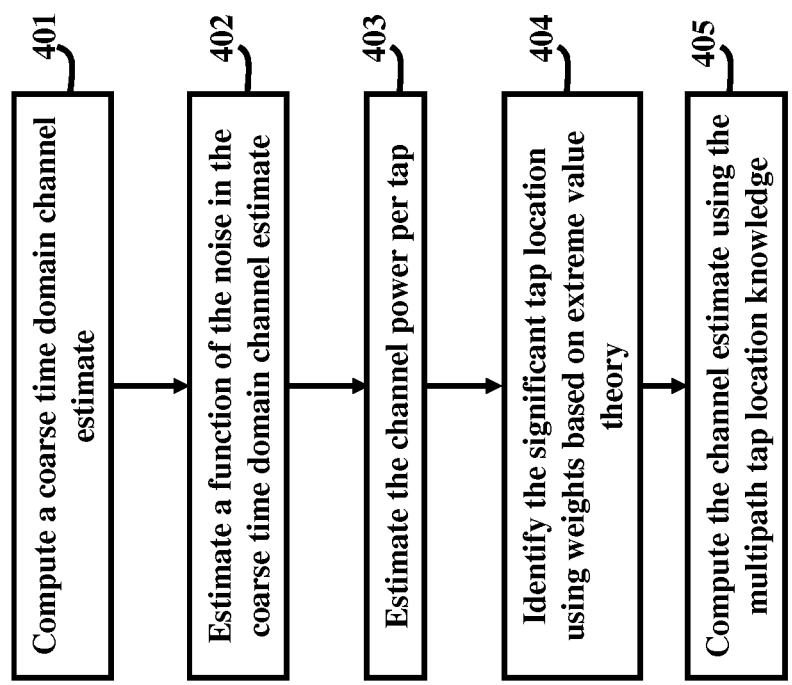
FIG. 4 is a flowchart depicting a method for performing channel estimation, according to embodiments as disclosed herein.

FIG. 4 is a flowchart depicting a method for performing channel estimation, according to embodiments as disclosed herein. An initial (coarse) time domain channel estimate is calculated (401), which is overparametrized compared to the actual channel impulse response. A function of the noise in the initial time domain estimate is then estimated (402). Depending on the way in which the tail of the noise pdf of the estimate varies, the EVD to which the maximum of the noise variables belong to can be found. The function may be variance or dispersion of the noise, which can be estimated using either mean, median, trimmed mean or a function of order statistics of the initial time domain estimates. Any suitable function of the noise in the initial time domain may also be estimated herein. The channel power per channel tap is estimated (403). The significant channel taps in the coarse time domain channel estimate are identified (404) using extreme value theory. The pdf of the maximum of the absolute value of m iid noise values in the initial channel estimate is used to distinguish between large value of noise and large absolute values which are due to significant channel taps. A refined channel estimate is computed (405) which exploits the knowledge of detected tap locations. This refined channel estimate can be computed using the same data else the detected tap location knowledge can be utilized in other frames/symbols. The process as described herein is relevant for channel impulse response estimation in any communications receiver, where the knowledge of the channel tap locations is not known. The various actions in method 400 may be performed in the order presented, in a different order or simultaneously. Further, in some embodiments, some actions listed in FIG. 4 may be omitted.

Figure 5:
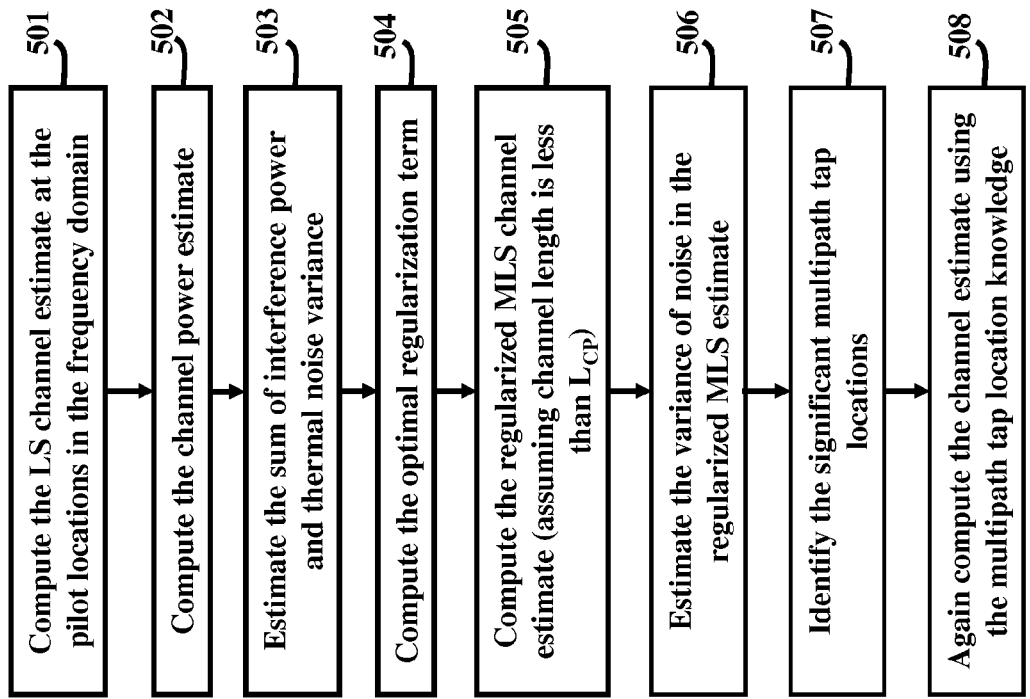
FIG. 5 is a flowchart depicting a method for performing channel estimation in an OFDM receiver, according to embodiments as disclosed herein.
Figure 6A:
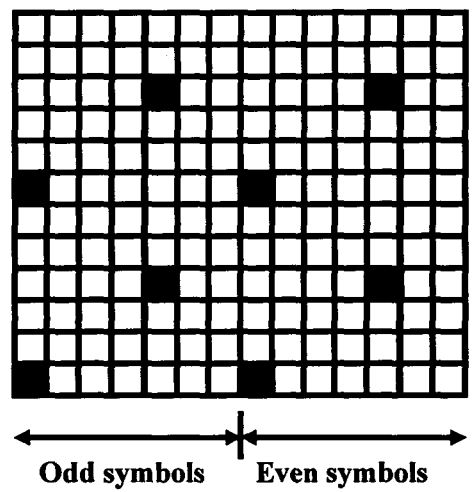
FIG. 6 illustrates a reference signal density, according to embodiments disclosed herein.
Figure 6B:
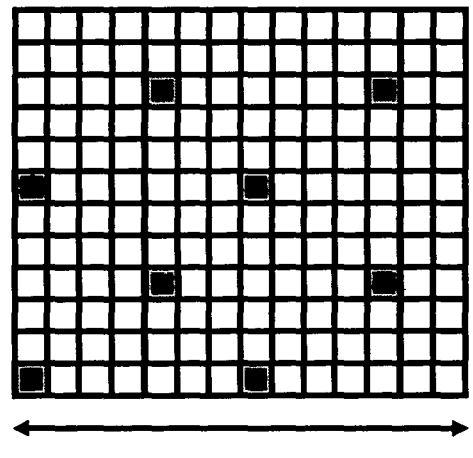
Figure 7:
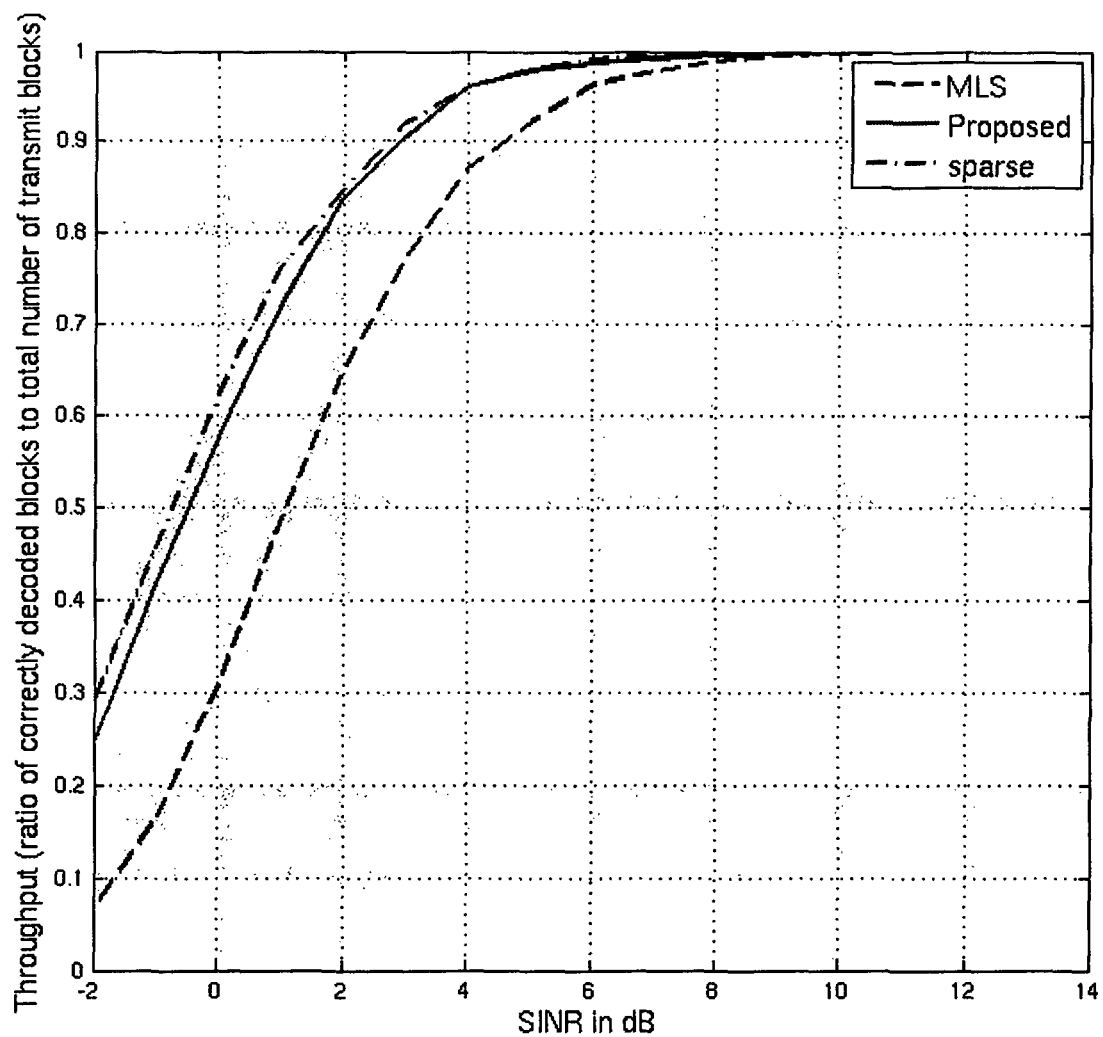
FIG. 7-18 depicts simulation results, according to embodiments disclosed herein.
Figure 8:
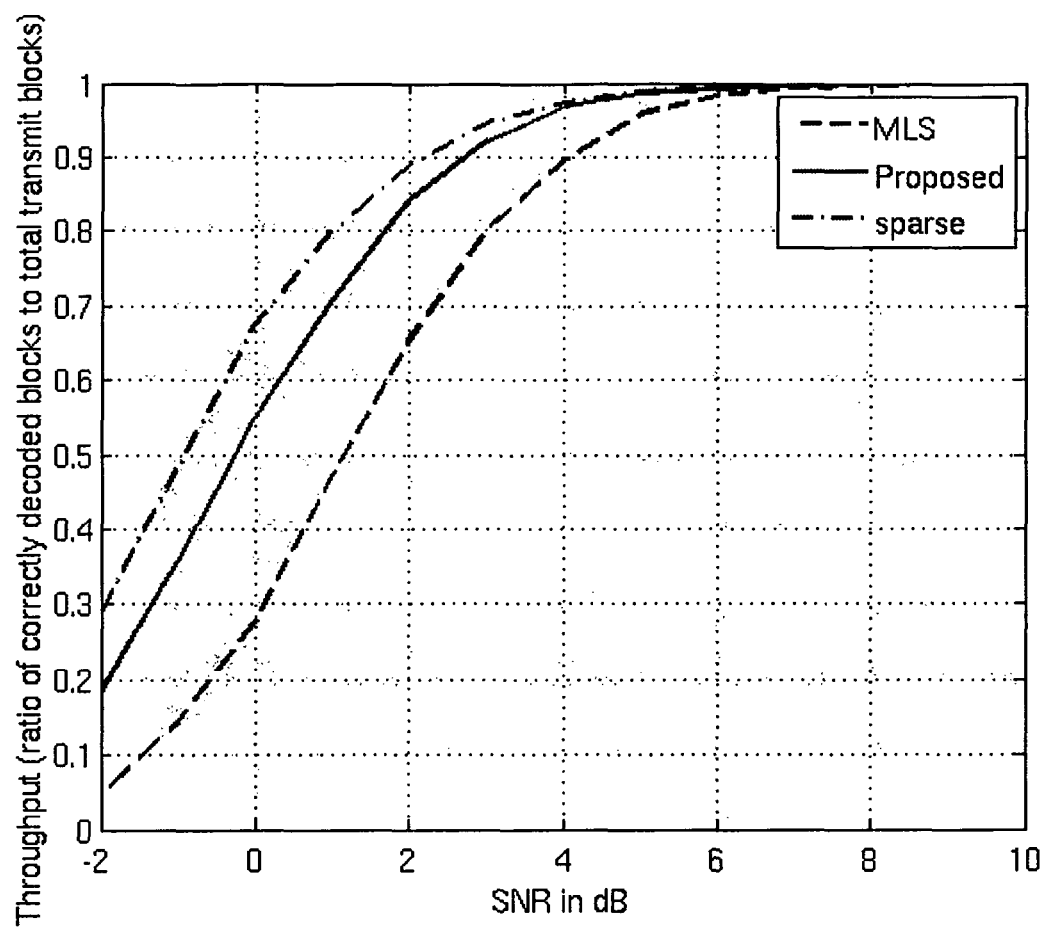
Figure 9:
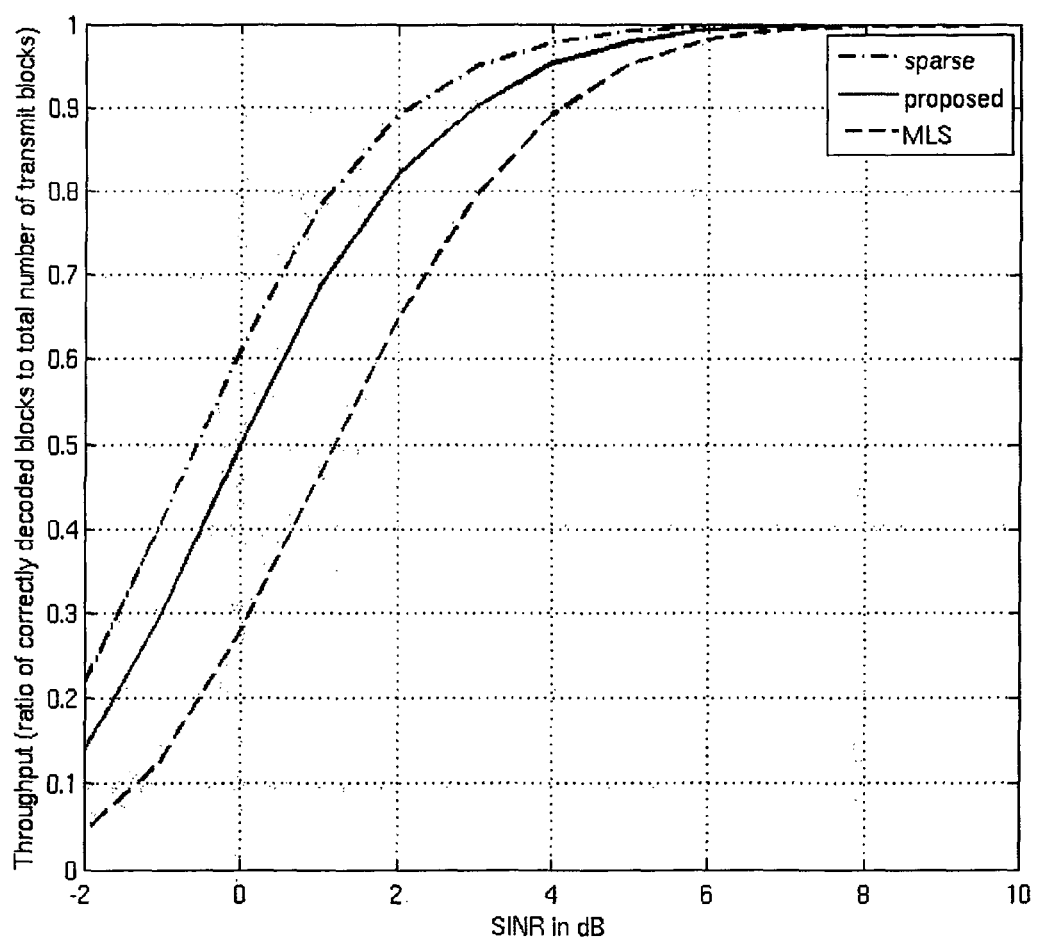
Figure 10:
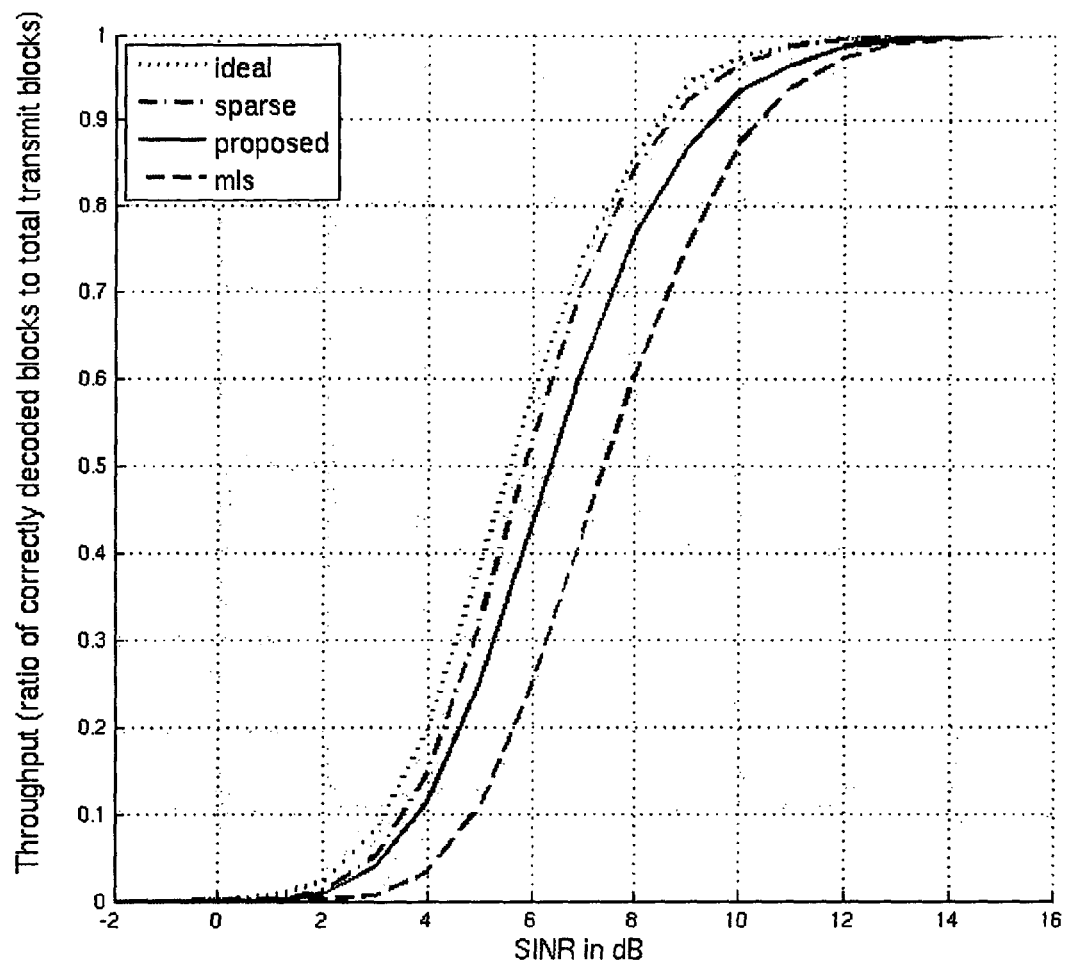

FIG. 5 is a flowchart depicting a method for performing channel estimation in an OFDM receiver, according to embodiments as disclosed herein. The LS channel estimates at the pilot locations are estimated (501) using the following equation:

$$\hat{H}_{j,n,p_i} = \frac{b_{j,n,p_i}}{S_{n,p_i}} \quad (6)$$

The channel power estimate is the calculated (502) using the equation:

$$\sigma_h^2 = \frac{1}{P} \sum_{p_i=1}^{P} |\hat{H}_{j,n,p_i}|^2.$$

Next, the sum of interference power and thermal noise variance is estimated (503). In an embodiment herein, the sum of interference power and thermal noise variance may be estimated using the guard tones. In case of slowly varying channels, the sum of interference power and thermal noise variance may be estimated by first estimating $\hat{H}_{j,n,pi}$ from the CRS in one symbol; use it to compute the residuals in another symbol and then obtaining the noise variance. If one has to compute both $\hat{H}_{j,n,pi}$ and $\sigma^2$ from the same symbol, then one could use a subset of the CRS for estimating $\hat{H}_{j,n,pi}$ and another subset for estimating $\sigma^2$. For example in LTE, where there are 100 pilots in one OFDM symbols, the pilots 1, 3, 5, ..., 99 can be used to obtain $\hat{H}_{j,n,pi}$ and then this channel estimate can be used along with pilots 2, 4, ..., 100 to compute $\sigma^2$. In another embodiment herein, let $\hat{H}_{j,n,pi}$ denote the channel estimate at $p^{th}$ pilot location in symbol n1 in the minimal time frequency block that can be assigned (i.e. in LTE this is the resource block pair and it comprises of 14 OFDM symbols while in the case of IEEE 802.16m this minimal unit is a subframe and consists of 6 OFDM symbols). Now a possible estimate of the noise variance is $$\hat{\sigma}^2 = \frac{1}{P} \sum_{p_i=1}^{P} |b_{j,n2,p_i} - \hat{H}_{j,n1,p_i} S_{n2,p_i}|^2$$

Here $b_{j,n2,pi}$ is the n2 received OFDM symbol and $p_i$ is the location of the $i^{th}$ pilot.

It can be shown that the asymptotic value of this interference and noise power estimate is $2\sigma^2$ in the case of LTE system, i.e., there is a bias term of $\sigma^2$ due to the use of the zero forcing estimate $\hat{H}_{j,n,pi}$. Hence, the following two modified estimates of $\sigma^2$ are proposed $$\hat{\sigma}^2 = \frac{\frac{1}{P}\sum_{p_i=1}^{P} |b_{j,n2,p_i} - \hat{H}_{j,n1,p_i} S_{n2,p_i}|^2}{2}$$

$$\hat{\sigma}^2 = \frac{\text{median}|b_{j,n2,p_i} - \hat{H}_{j,n1,p_i} S_{n2,p_i}|^2}{2}.$$

where median is the median of the P residuals.

The optimal regularization term is computed (504), where the optimal regularization term $\gamma_{opt}$ based on Bayesian regularization theory is given by $$\gamma_{opt} = \frac{\sigma^2 L_{CP}}{\sigma_h^2}$$

$$\text{where } \sigma_h^2 = \sum_{i=1}^{L} |h_j(i)|^2$$

is the CIR power. Each tap is assumed to have equal power and hence channel power per tap is $$\frac{\sigma_h^2}{L_{CP}}.$$

If one actual had some additional knowledge about the channel such as the power delay profile, this can be used while computing $\gamma_{opt}$. If one knew the covariance matrix of the noise and interference it can be used while computing $\gamma_{opt}$.

$\gamma_{opt}$ is used in eq (4) in place of $\gamma$, i.e.

$$\hat{h}_{j,n} = (A_{n,L_{CP}}^H A_{n,L_{CP}} + \gamma I_{L_{CP}})^{-1} A_{n,L_{CP}}^H b_{j,n} \quad (4)$$

to obtain (505) the regularized MLS estimate, which assumes that the channel length is less than $L_{CP}$, i.e. The MLS estimate is a vector of dimension $L_{CP}$. Use of $\gamma_{opt}$ to obtain the regularized MLS estimation reduces the smearing of the CIR estimate in the time domain. The presence of guard tones in the OFDM symbol can lead a highly smeared time domain channel estimate if $\gamma=0$ or if an adhoc value of $\gamma$ is used in (4). When the time domain channel estimate is highly smeared, one cannot use the time domain channel estimate for any significant tap detection or model order detection. Hence, use of an optimal $\gamma$ has been proposed given by $\gamma_{opt}$ so that the CIR is no longer smeared and it is possible to perform any significant multipath tap detection and model order estimation in the time domain itself An estimate of the variance of the noise in the time domain CIR estimate (505) is obtained in (506). Using the time domain CIR estimate and the estimate of the noise in the time domain estimate, the significant tap locations are estimated (507). In an embodiment herein, any suitable method which determines the significant tap in a parallel mode or sequential mode may be used. In case of very low SINR, assume that the model order is very small and fix the model order to gLcp, with g is based on the receiver's awareness of the channel selectivity and is less than 1. It can be shown through simulations that the embodiment mentioned above works for SINRs below 2 dB. Assuming that number of non-zero taps to be eight when the CP length $L_{CP}$ is 80 works very well for all the channel models defined for LTE, i.e. PEDA, EPEDA, PEDB, EVA and ETU tabulated in Table 1.

TABLE 1

| Channel model | | Power Delay Profile |
|---|---|---|
| Ped-A | P (dB) | 0.0, −9.7, −19.2, −22.8 |
| | Delay (ns) | 0, 110, 190, 410 |
| Ext-Veh-A | P (dB) | 0.0, −1.5, −1.4, −3.6, −0.6, −9.1, −7.0, −12.0, −16.9 |
| | Delay (ns) | 0, 30, 150, 310, 370, 710, 1090, 1730, 2510 |
| Ext-Typ-Urban | P (dB) | −1.0, −1.0, −1.0, 0.0, 0.0, 0.0, −3.0, −5.0, −7.0 |
| | Delay (ns) | 0, 50, 120, 200, 230, 500, 1600, 2300, 5000 |
| Ped-B | P (dB) | 0.0, −0.9, −4.9, −8.0, −7.8, −23.9 |
| | Delay (ns) | 0, 200, 800, 1200, 2300, 3700 |

In another embodiment herein, the significant taps are treated as outliers, with respect to the values in the other tap locations. For a dense channel, the significant taps are treated as outliers with respect to the expected noise power in the regularized MLS estimate with γopt. Since the noise and interference is Gaussian, the theoretical variance of each element of $\hat{h}_{j,n}$ is given by $$\sigma_b^2 = \frac{\frac{\sigma^2}{P}}{1 + \frac{L_{CP}\sigma^2}{P\sigma_h^2}},$$

where P is the number of pilots. One proposed estimate of the variance of the noise in $\hat{h}_{j,n}$ especially in the case where the significant taps are sparse is given by $\sigma_m^2 = \eta \text{median}(|\hat{h}_{j,n}|^2)$ where η is a constant and the median operation picks the median of the vector $|\hat{h}_{j,n}|^2$. In the simulation results, η=1.2011 has been chosen. Three possible estimates of the noise variance of the estimated taps are $$\sigma_f^2 = \frac{\sigma_b^2 + \sigma_m^2}{2}, \sigma_f^2 = \sigma_m^2, \sigma_f^2 = \sigma_b^2$$

Hence a function of $\sigma_f^2$ will be used as a metric to distinguish between values of $\hat{h}_{j,n}$ which are outliers (i.e., correspond to significant channel taps) and those which are due to just thermal noise and interference (i.e., corresponds to only noise and not the channel taps). In the case when the noise in the time domain channel estimate is non-Gaussian, a function of the dispersion of the noise in the time domain estimate can be used to distinguish between values of $\hat{h}_{j,n}$ which are outliers (i.e., correspond to significant channel taps) and those which are due to just noise and interference (i.e., corresponds to only noise and not the channel taps).

Extreme Value Theory (EVT) can be used to distinguish between extreme values due to noise and those extreme values which are due to significant taps of $\hat{h}_{j,n}$. When the noise is Gaussian, the absolute value of the noise has a Rayleigh pdf. To differentiate between values in $\hat{h}_{j,n}$ which contain only noise and values in $\hat{h}_{j,n}$ which correspond to channel taps, the absolute value of $\hat{h}_{j,n,l}$ is used to check whether the lth value in $\hat{h}_{j,n}$ is due to a significant channel tap. In the absence of a significant tap at the lth tap location $|\hat{h}_{j,n,l}|$ would be Rayleigh distributed (i.e. $\hat{h}_{j,n,l}$ would be a Gaussian random variable with zero mean and variance $\sigma_f^2$) and its extreme value distribution (EVD) would be a Gumbel pdf.

Embodiments herein look at channel estimation in Gaussian noise and interference, the same method can be used for sparsity detection even in the presence of non-Gaussian noise and interference. In the case of non-Gaussian noise, start with the maximum likelihood estimator (MLE) for the specific noise model or an M estimator or any initial channel estimate and get the time domain estimate of the CIR. Also estimate the characteristics of the noise in the initial channel estimate such as whether the noise has exponential tail, power law tail or has limited support. Then the extreme value distribution (EVD) which is appropriate for the noise model is used to distinguish between values of the channel estimate which are due to a significant tap and those values which are due to only noise. As an example if the noise in $|\hat{h}_{j,n}|$ has a thick tailed density function such as the Cauchy probability density function (pdf), then to distinguish between significant channel taps and noise, the Frechet EVD should be used The cdf $\phi 1(.)$ of the maximum of m iid random variables is the Gumbel distribution, if the tail of the initial pdf (pdf of the i.i.d random variables) decreases exponentially. If the receiver noise is purely complex Gaussian, then the noise values in $\hat{h}_{j,n}$ is Rayleigh distributed. It can be shown that the maximum $r_{max}$ of any set of m iid values from a Rayleigh distribution is a random variable characterized by the Gumbel distribution with the cdf given by $$\phi_1(r_{max}) = \exp[-e^{-\alpha(r_{max}-u_m)}] \quad (10)$$

where α and $u_m$ are scale and location parameters which depend on the initial distribution cdf F(.). α is the hazard rate of the initial distribution and $u_m$ is the characteristic largest value of the initial distribution. When F(.) is a Rayleigh distribution parametrized by $\sigma_f^2$, it can be shown that $u_m$ and α are given by $$u_m = \sqrt{\sigma_f^2 \ln m} \quad (11)$$

and $$\alpha = \frac{2u_m}{\sigma_f^2}. \quad (12)$$

Now the EVT based weight is defined as $$w_{j,n,l} = \phi_1(|\hat{h}_{j,n,l}|) = \exp\left[-e^{-\frac{2\sqrt{\ln m}\left(|\hat{h}_{j,n,l}|-\sqrt{\sigma_f^2 \ln m}\right)}{\sigma_f}}\right] \quad (13)$$

This weight is based on the fact that in the absence of a channel tap at the lth location, the maximum of any set of m values of $|\hat{h}_{j,n,l}|$ follow the Gumbel distribution with the parameters $u_m$ and α given by (11) and (12) respectively. Since the Gumbel distribution is the cdf of the extreme values of the statistic $|\hat{h}_{j,n,l}|$, it can be used to distinguish between extreme valued observation which arise due to the Rayleigh distribution and the extremes which are due to significant channel taps. In other words, $1-w_{j,n,l}$ gives the probability of occurrence of an observation greater than or equal to $|\hat{h}_{j,n,l}|$ given that only one out of any m observations of $|\hat{h}_{j,n,l}|$ is expected to exceed $u_m$ in the case where $\hat{h}_{j,n}$ has only noise and no channel taps. Those observations corresponding to a large weight $w_{j,n,l}$ are treated as possible outliers (i.e., the location corresponding to these observation probably contain the channel taps and are not only noise values. Since the EVT based weight has large values only for observations with $|\hat{h}_{j,n,l}|$ greater than $u_m$ it is very effective in finding out the channel taps and tries to reduce both underfitting and overfitting probability. The larger the value of m, larger are $u_m$ and $\alpha$ and steeper is the function $\phi 1$. Hence, ideally m should depend on the ratio of significant tap power to $\sigma^2_f$. If the total channel energy is equally divided among all the channel taps, a proposed suggestion for m is m=max(20,min(100, int[$\sigma^2_h$/$\sigma^2_f$])); where int[.] stands for the integer part, min(x,y) stands for the minimum of x and y and max(x,y) stands for the maximum of x and y. The minimum value of m is constrained to be at least 20 since the EVT weight functions are defined for large m with at least the minimum value of m being 20. m is also upper bounded by 100 so as to not have a very steep weight function at high SNRs which lead to numerical problems at high SNRs. One could also just fix the value of m to a fixed value between 20 and 100.

Instead of computing the EVT weight function in (13) for each tap value $\hat{h}_{j,n,l}$, $z=-(\ln(\ln(1/th)-\alpha u_m)/\alpha$ can be computed and each value of $|\hat{h}_{j,n,l}|$ can be compared with z. If $|\hat{h}_{j,n,l}|>z$ then treat the lth tap location as a significant tap location. Here th is the threshold value for the weight function beyond which the probability that the tap location actually contains a significant tap is high.

The various actions in method 500 may be performed in the order presented, in a different order or simultaneously. Further, in some embodiments, some actions listed in FIG. 5 may be omitted.

Compute the regularized MLS estimate with $\gamma_{opt}$ being given by (3). Now the length of $\hat{h}_{j,n}$ is $L_{CP}$ out of which only a few values correspond to the actual channel taps. For example, in the downlink of release 8 system the CP length is 80 samples for the first OFDM symbol in a resource block (RB) and otherwise it is 72 samples in the case of the normal CP. However, most of the channel models specified by LTE in their evaluation methodology have only 4 to 12 non-zero taps whose location depends on the channel model. So the $l^{th}$ value in $\hat{h}_{j,n}$ can be written as either $$\hat{h}_{j,n,l} = h_{j,n,l} + n_{j,n,l} \quad (14),$$

when the $l^{th}$ tap corresponds to a significant tap; or $$\hat{h}_{j,n,l} = n_{j,n,l} \quad (15)$$

only noise at the $l_{th}$ tap location.

Therefore each value $\hat{h}_{j,n,l}$ is taken and the corresponding EVT weight assigned to it to classify it as either significant tap or as only noise. Whenever the EVT weight is greater than a threshold it indicates that there is a very high probability that the $l^{th}$ value, $\hat{h}_{j,n,l}$ actually corresponds to a significant tap and is not due to interference and noise alone. So all the values of $\hat{h}_{j,n,l}$ are looked at i.e. CP number of values and for each value look at the corresponding EVT value to decide whether to keep the tap location or not.

Once all the significant taps are detected, this tap location information is used to obtain a refined channel estimate. The refined channel estimate will be much better than the initial channel estimate since it exploits additional information. The refined channel estimate can be a regularized MLS estimate whose DFT matrix F will have only columns corresponding to the detected tap locations or the refined channel estimate could be minimum mean square error (MMSE) estimate which uses the detected tap location information, or the refined estimate can be any estimator which uses the knowledge of the detected tap locations. If the refined estimate is a regularized MLS estimate the γopt to be used can also be recomputed by again computing channel power per tap (using the knowledge that there are only l' taps) and the sum of noise and interference at the receiver.

This new estimate can be expected to be much better than the MLS estimate, since now the number of unknowns is only l' (l' is the number of detected significant taps) compared to $L_{CP}$ and l' is usually much smaller than $L_{CP}$. Further an estimator designed with sparsity knowledge is much easier to implement than the MLS based on CP length since now the dimensions of the matrices and vectors involved depend on l', which is usually much smaller than $L_{CP}$.

Once the significant taps locations are found, these values can be used for a couple of RBs since channel tap locations do not change as fast as the phase and amplitude of the taps. In a static environment the tap location information can be used for an entire frame.

In the embodiments herein, the assumption is that channel has at least one tap and hence apriori fix the first tap location at zero delay.

In another embodiment herein, exploitation of the fact that in the presence of high interference (i.e. cell edge scenarios), no model order method works very well since the noise even swamps out many significant taps and hence one should hard limit the model order in such cases. Based on this idea in case of low SINR scenarios, one can compute the EVT weight to detect the significant taps and also do a sanity check on the computed EVT weight by not considering taps beyond a fixed model order. For example, if the SINR<2 dB and then if the EVT weight is greater than the threshold and if the tap position for which this happens to be greater than a fixed assumed model order M, this channel tap is not considered to be significant. So in low SINR region the model order is limited to M by assumption, however unlike the fixed model order method not all the M taps are considered to be significant taps.

In another embodiment herein, the proposed EVT based algorithm can be further improved by multiple iterations of the method. First estimate $\sigma^2_h$ and $\sigma^2$, compute the MLS based channel estimate with a $\gamma_{opt}$ and then use this channel estimate to again compute a refined estimate of $\sigma^2_h$ and $\sigma^2$ and then re-compute the regularized MLS with the refined $\gamma_{opt}$. Then use the EVT based method and the refined $\sigma^2_h$, $\sigma^2$ and MLS channel estimate to detect significant taps. Another possible option is to set the threshold beyond which a tap is considered significant at a low value, hence more taps are detected as significant and then compute the regularized MLS with the DFT matrix corresponding to the detected taps. Then obtain a cleaner estimate of $\sigma^2_h$, $\sigma^2$, $\sigma^2_f$ and then increase the threshold and hence reduce the number of significant taps.

Below are some improvements which exploit the structure of the LTE common RS signal design to further improve the proposed channel estimation algorithm.

One can use the CRS from both symbol 0 and symbol 4 to get more averaging while computing $\hat{h}_{j,n}$ in the case of slow fading/pedestrian environment. Since the CRS in these symbols do not fall on the same subcarriers by using CRS signal from both symbol 0 and 4 one can obtain significant averaging and exploit frequency selectivity. Similarly one can use the CRS in symbol 7 and symbol 11.

The CIR sparsity information provided by the embodiments herein can be used to provide power delay profile information at the receiver. The LTE frame structure can also have dedicated pilots which are the precoded pilots intended to the particular user. While estimating channel with the dedicated pilots, the user can make use of the sparsity information from the common reference signals (wideband pilots) using the proposed algorithm. In a similar fashion one can apply the proposed method on the midamble in the IEEE 802.16m frame to obtain power delay profile information which can then be used while performing channel estimation in the other OFDM symbols.

In the downlink transmission of the 3GPP LTE standard, the current common pilot density (reference signal density) is as defined in FIG. 4 for 2 and 4 transmit antenna systems. The shaded blocks indicate pilot symbols and these pilot symbols span the entire bandwidth. In the case of the LTE system with 1024 subcarriers and 400 virtual carriers, there are 100 reference signals spanning the entire bandwidth in those OFDM symbols which carry reference signals. This reference signal design is based on a number of factors such as the maximum targeted Doppler, the worst case frequency selectivity that will be seen in the system, the interference and thermal noise scenario etc.

LTE standard uses both close loop and open loop transmission schemes. The code book based transmission often termed as closed loop scheme uses the channel dependent precoder, which tries to maximize the received SNR. These schemes require the channel knowledge at the transmitter whose quality often affects the performance significantly. The use of open loop diversity schemes provides significant diversity benefit without any array gain as that of closed loop counterpart. One such open loop scheme is the space frequency block coding technique (SFBC) which is the variant of space time block codes (STBC) scheme proposed by Alamouti. The receiver side processing uses MMSE algorithm which gives better S(I)NR improvement over other existing algorithms. A simulation was performed of a system with various numbers of dominant users, who will interfere with the desired user with the fixed SIR. In the interference limited cases, multi user MMSE algorithm are used which avails the channel knowledge of the interfering cell. The channel estimation is applied over all the interfering cell's common pilots, assuming the knowledge of their pilot sequence. The channel estimation is carried out with the proposed and the existing schemes for the comparison purpose. It seems that the performance of the system employing the proposed algorithm provides significant improvement in the throughput compared with that of the existing ones.

A threshold of 0.75 has been used for the EVT based weight function, i.e., if $$w_{j,n,l} = \phi_1(|\hat{h}_{j,n,l}|) = \exp\left[-e^{-\frac{2\sqrt{\ln m}\left(|\hat{h}_{j,n,l}|-\sqrt{\sigma_f^2 \ln m}\right)}{\sigma_f}}\right] > 0.75$$

then it is assumed that the $l^{th}$ tap location has significant value.

FIGS. 7-10 show the performance of the proposed scheme in the noisy channel without any co-channel interferers in different channel models. FIGS. 11-18 have been simulated with different number of co-channel interferers contributing to the SIR (Signal to Interference) term. In these cases, pre-whitening technique has been applied to whiten the coloured interference from other base stations before applying the MMSE receiver algorithm. Since LTE downlink pilot structure has a defined structure in both time and frequency grid, wideband channel estimation with the regularization parameter is used to stabilize the inversion matrix. The estimates obtained from the proposed method outperform the conventional MLS system significantly. Even at the cell-edge case, where the channel estimates will often be poor, the proposed method yields a good quality channel estimate.

HARQ is the scheme to improve the system throughput by re-transmitting the corrupted blocks based on the received acknowledgment. This method improves the performance by transmitting different parity bits along with the systematic bits at each re-transmissions. The throughput of the system depends on the number of retransmissions and the rate used for each re-transmission. Suppose if two transmissions are required for the correct decoding, then the throughput will be calculated as given below.

$M$=2(QPSK modulation)

$\gamma$=½(Coding Rate)

$N$=2(Number of Re-transmissions)

$\rho$=$\gamma$*$M/N$=2 bits/sec/Hz(Effective TX-bits)

So, as the N increases the effective system throughput will come down. The throughput calculation is obtained by dividing the total number of correctly received blocks to the total transmitted blocks. The retransmission blocks also been considered as an individual blocks as far as the HARQ is concerned.

$$\eta = \frac{N_{cb}}{N_{txb} + N_{rtb}}$$

$$\beta = \gamma * M$$

$$\upsilon = \eta * \beta$$

where $N_{cb}$ is the total correctly received blocks, $N_{txb}$ is the total newly transmitted blocks, $N_{rtb}$ is the total re-transmitted blocks, $\eta$ is the throughput, $\beta$ is the effective informative bits transmitted and $\upsilon$ is the spectral efficiency. The modulation and coding terms should also be considered in order to obtain the spectral efficiency. The performance improvement with the HARQ is evident from the plots obtained with the proposed scheme. Since MLS channel estimation provides corrupted estimates compared to the proposed scheme, systems employing MLS algorithm often requests more number of retransmissions to acknowledge positively compared with the proposed scheme which does at the fewer re-transmissions. So, the proposed method for estimating the channel provides significant improvement in terms of the system capacity by reducing the retransmission blocks. The resource utilization will increase with the number of retransmission which will be seen in the systems employing MLS algorithm at the cell-edge.

FIG. 7 to FIG. 10 corresponds to the single user case where the x axis is the SINR and y axis corresponds to throughput in term of fraction of blocks which have been correctly decoded. The proposed EVT based method outperforms MLS for all the channel models and has a performance very close to the Sparse method which actually knows the multipath locations a priori. The transmitter and receivers use SFBC Alamouti processing.

Figure 11:
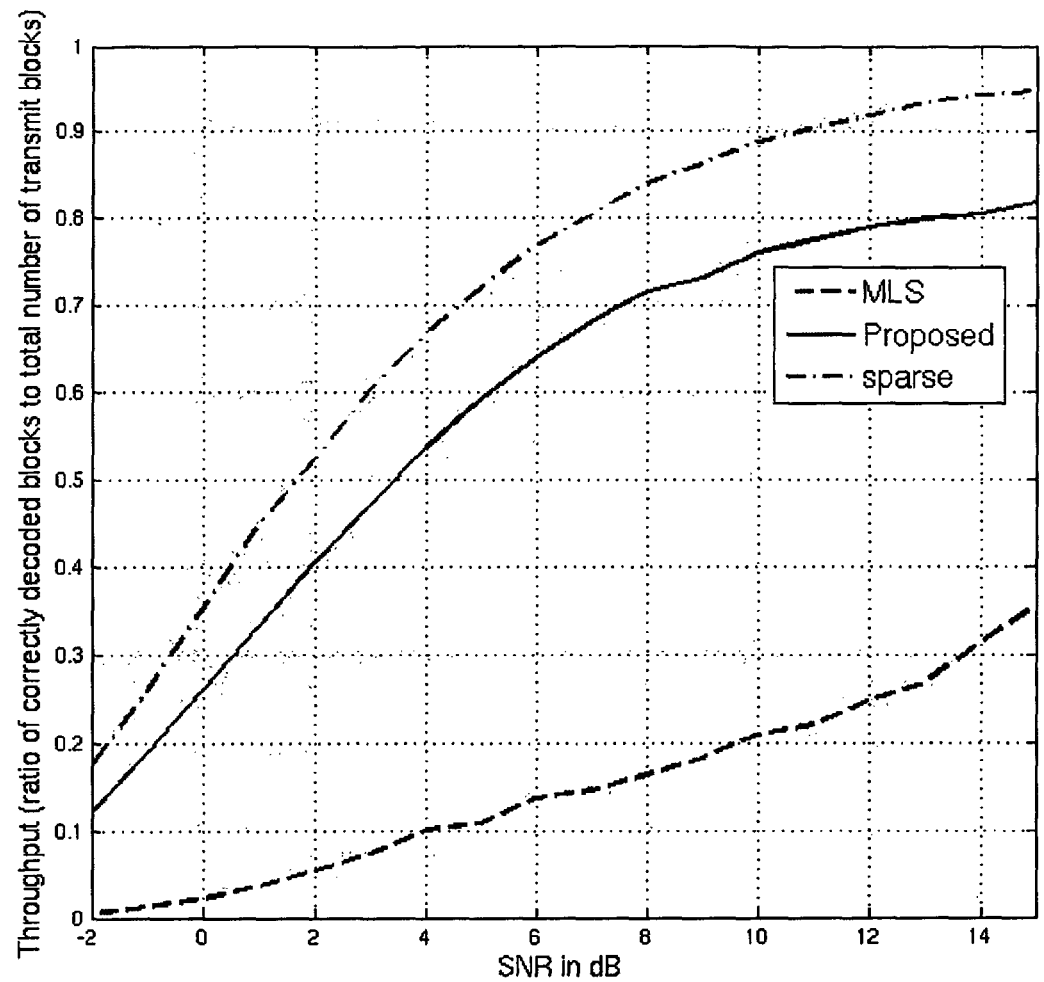

FIG. 11 corresponds to the case where there is a single dominant interferer of power 0 dB and here the x-axis corresponds to SNR (which also includes the other interferers modeled as noise). The channel model is EVA and modulation is QPSK. Here the MLS estimator has a very poor performance compared to the proposed scheme, i.e., at 8 dB SNR only 18% of the blocks are correctly decoded in the case of MLS estimator while the proposed method gives a throughput of 0.7, i.e. about 70% of the blocks are correctly decoded while if one actually knew the tap locations, at most 80% of the blocks would have been correctly decoded. At the transmitter, a single antenna transmit scheme is used while at the receiver a multiuser MMSE scheme is used.

Figure 12:
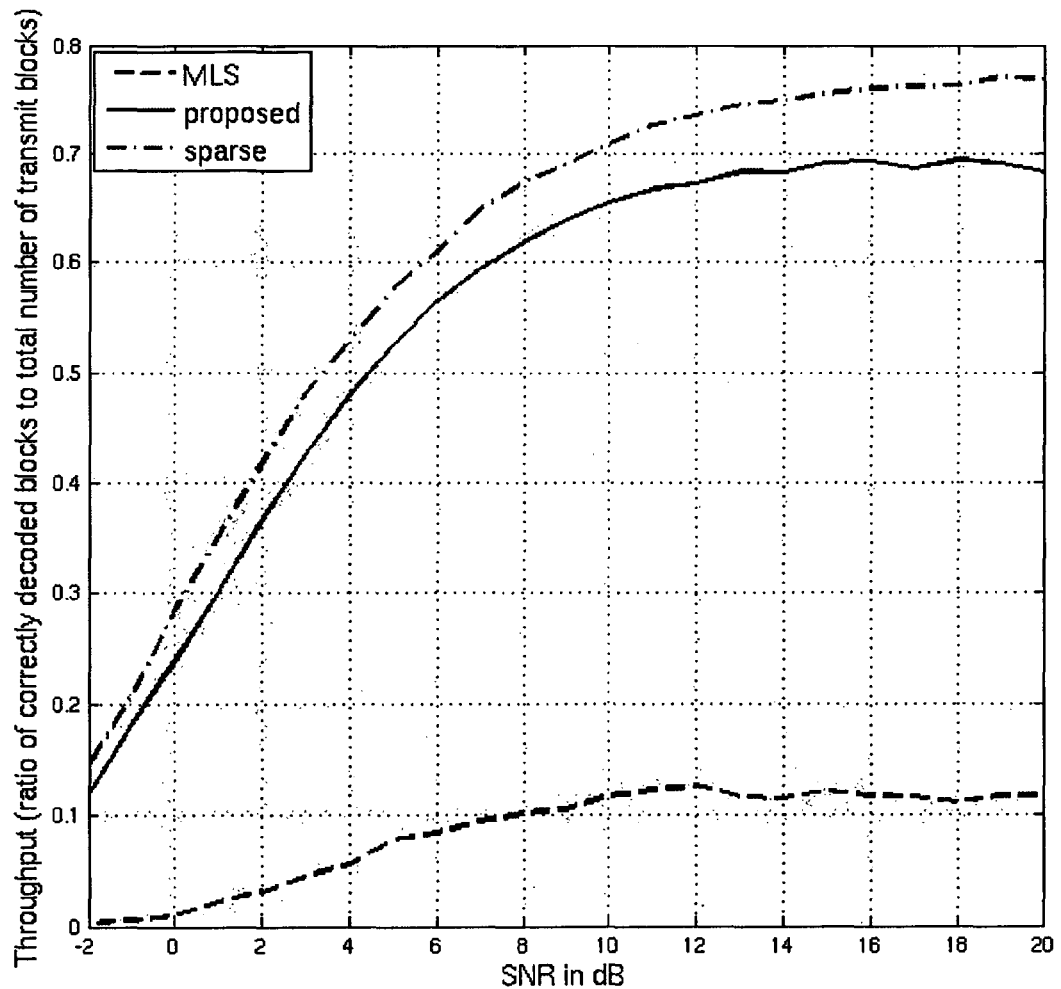
Figure 13:
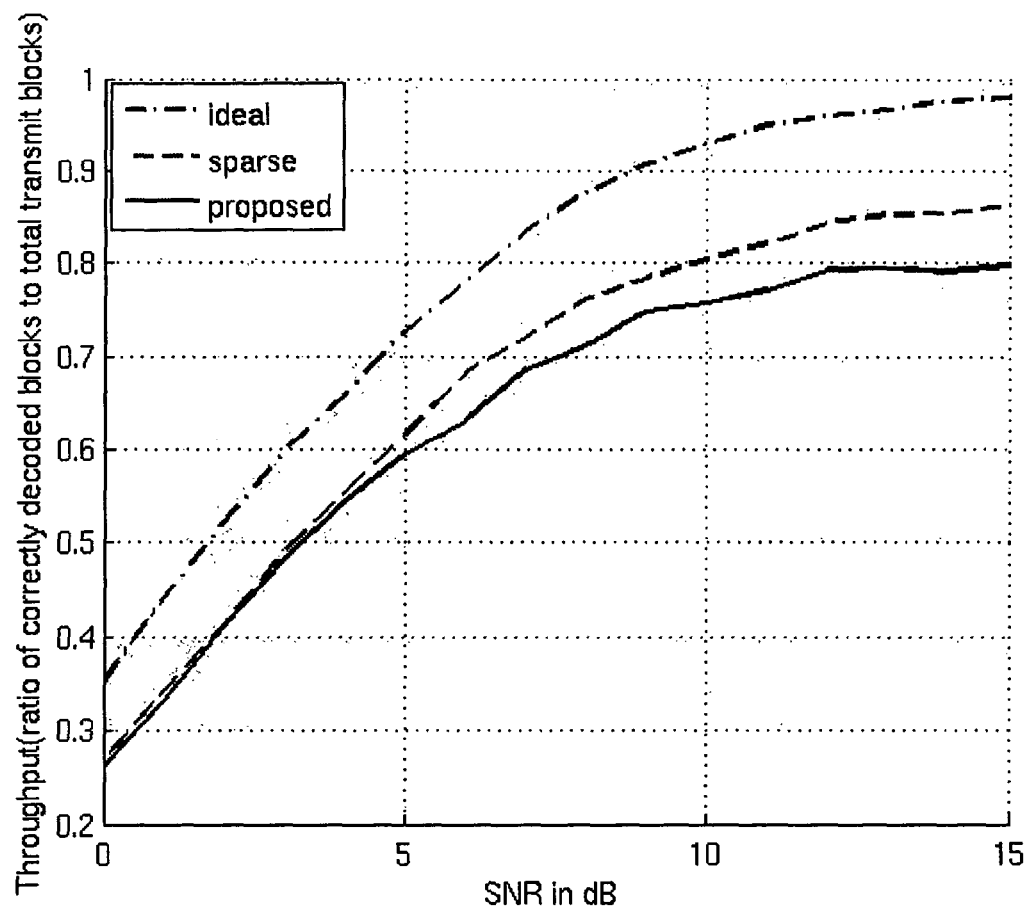
Figure 14:
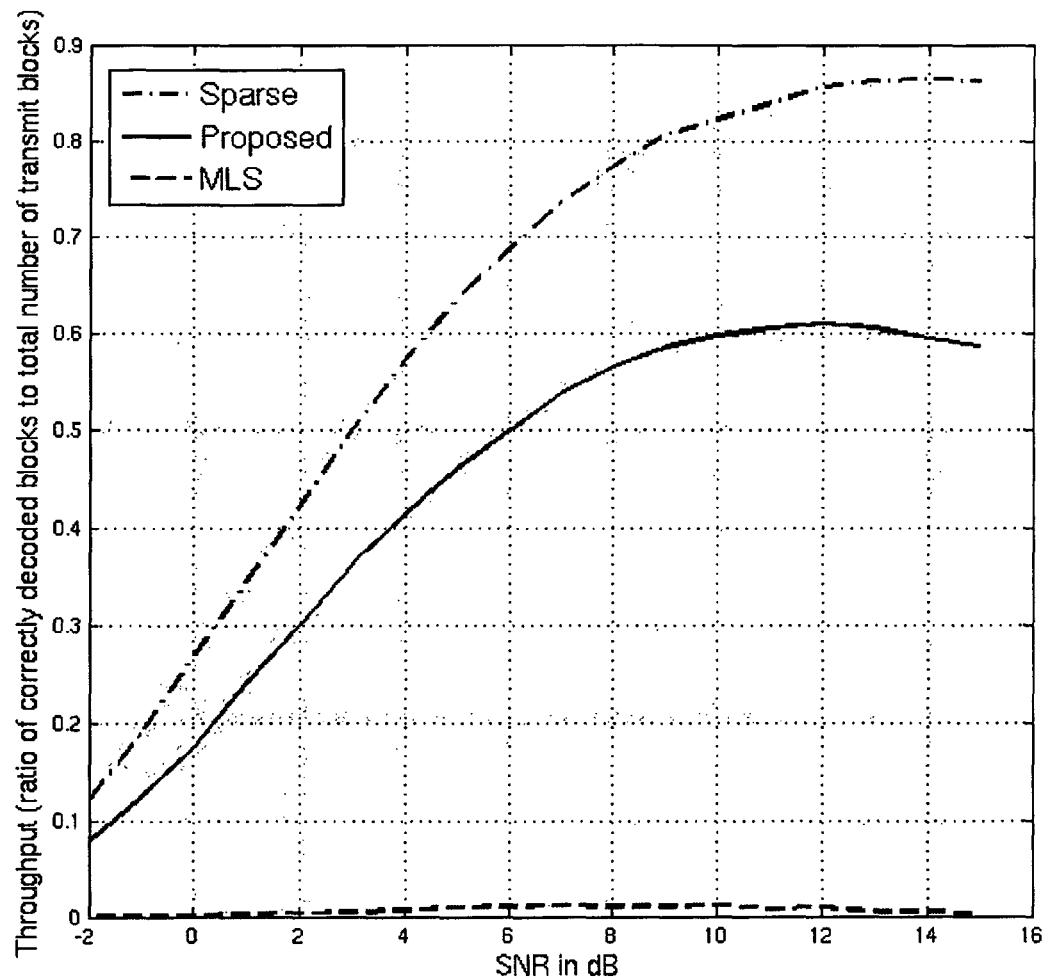

FIG. 12 to FIG. 15 correspond to the case where there are two dominant interferers with interferer power of 0 dB and −3 dB respectively. FIGS. 12 and 13 corresponds to an EPEDA channel model. However in FIG. 12, the receive scheme is a multiuser MMSE scheme while in FIG. 13, the receive scheme is m1 decoder multiuser. Furthermore while in FIG. 12, the channel taps locations have been estimated using only the CRS in symbol 1. In FIG. 13, the channel tap locations have been estimated using CRS from both symbol 1 and symbol 4 and hence there is more noise averaging. Here the MLS estimator has very poor performance less than 15% of the packets get through while in FIG. 12, the throughput in terms of fraction of correctly decoded packets is 0.6 at 8 dB and in FIG. 13, it is 0.75. From the figures, it is clear that the proposed scheme has a performance very close to the sparse scheme which actually knows the tap locations.

Figure 15:
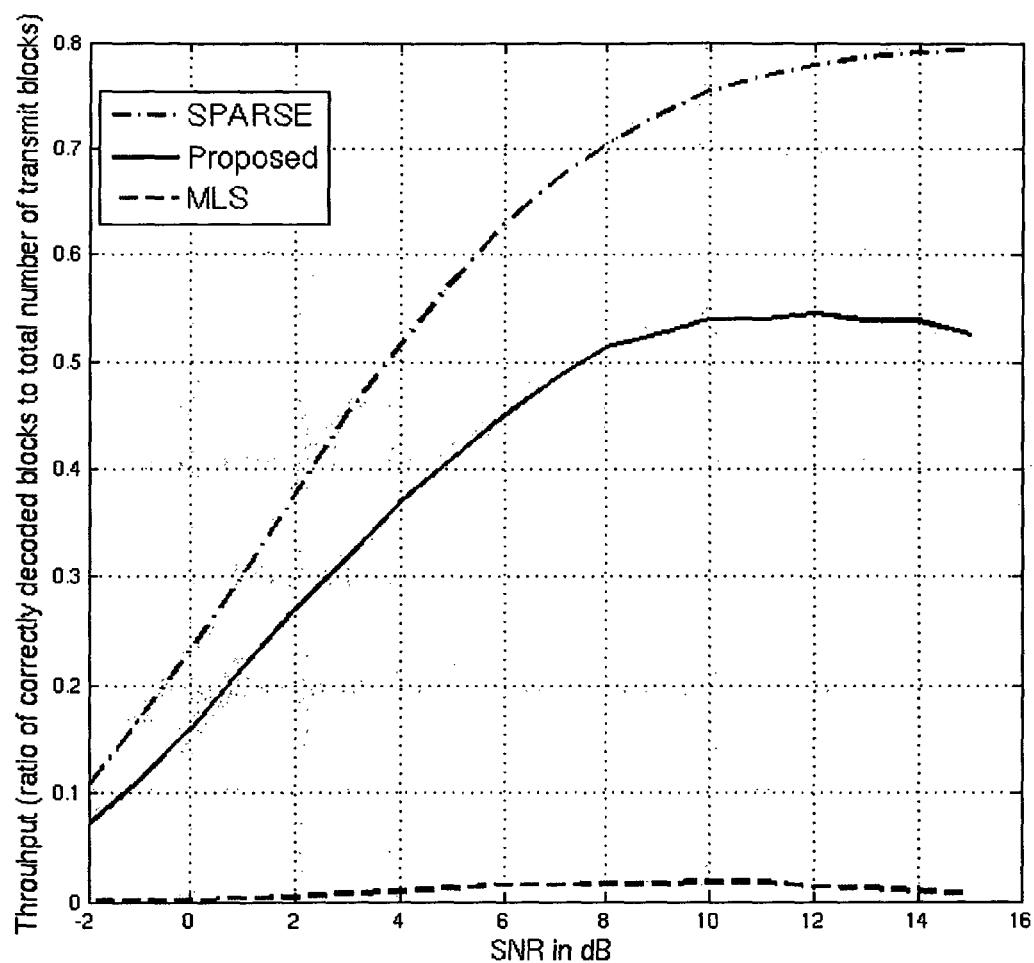
Figure 16:
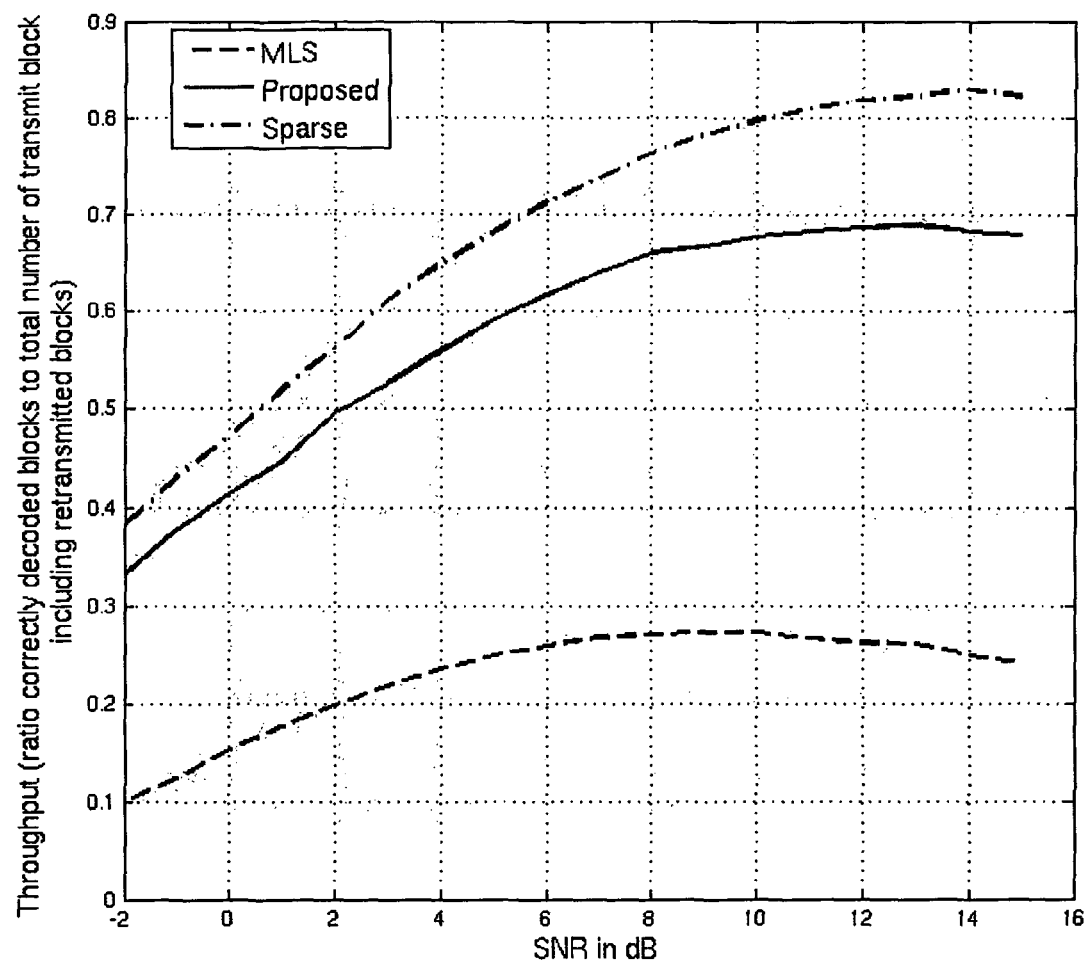
Figure 17:
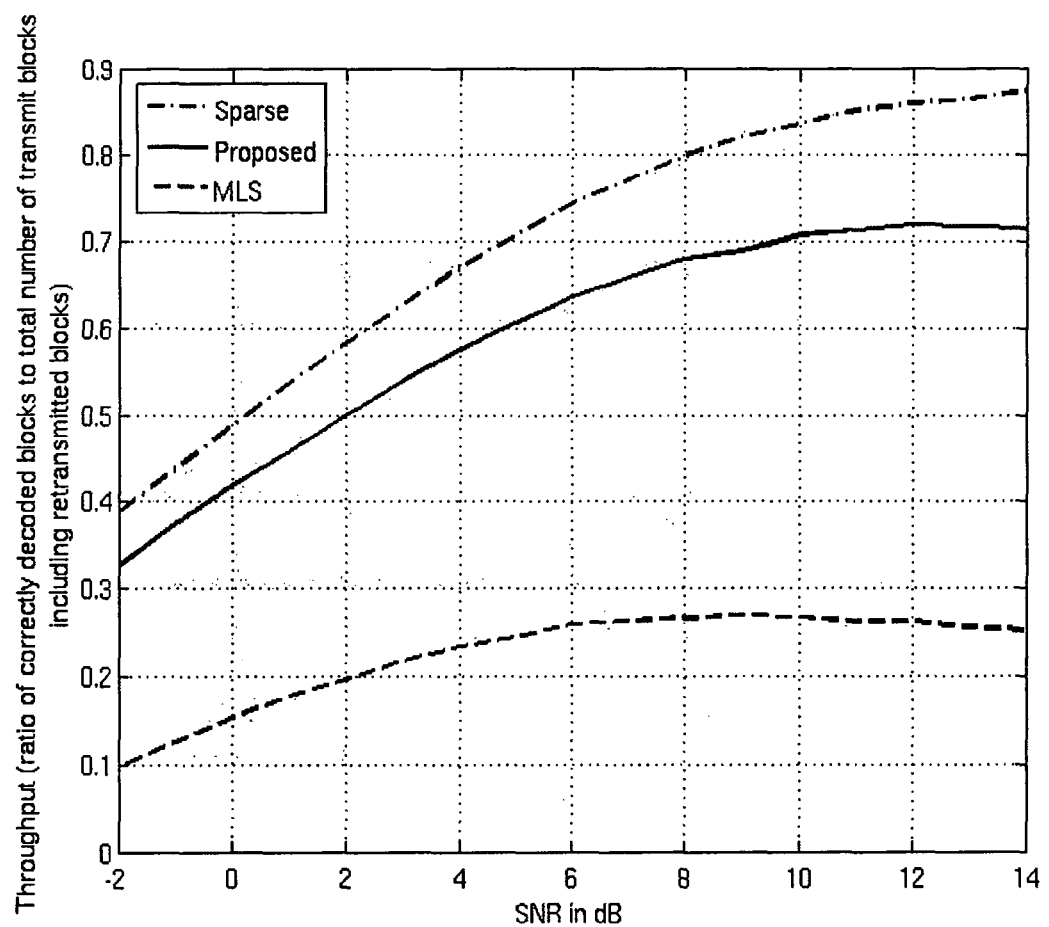
Figure 18:
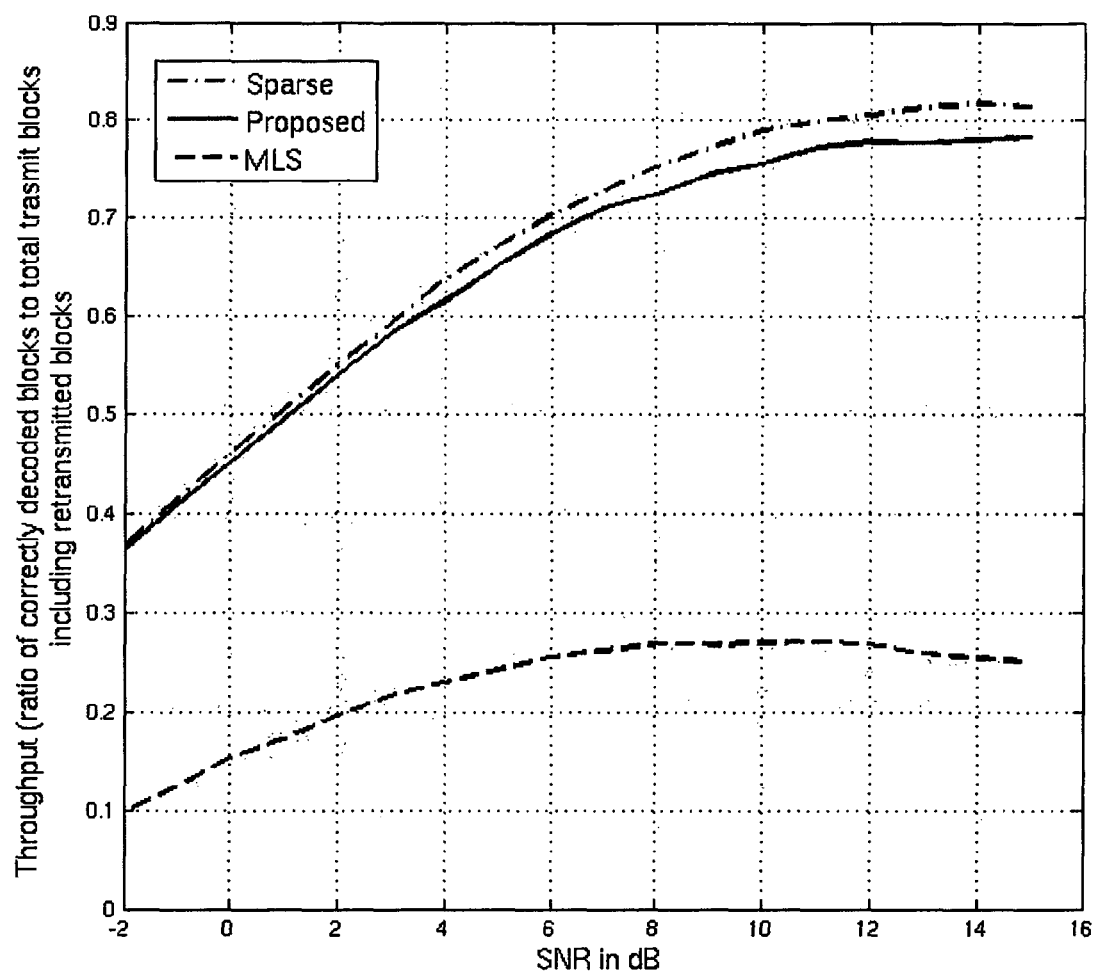

FIG. 15 corresponds to the case of EVA channel model with 3 dominant interferer with powers 0, −3 and −6 dB respectively. The MLS based scheme has extremely poor performance not even 5% of the blocks are correctly decoded while in the case of the proposed method at least 55% of the packets are correctly decoded. However there is a gap between the proposed method and the method which actually knows the channel taps locations. So far the HARQ mechanism has not been enabled while computing throughput. FIG. 16 to FIG. 18 show the throughput performance of the various schemes in the case of 3 dominant interferers with power 0, −3 and −6 dB respectively when the HARQ mechanism is enabled with the maximum allowed retransmissions set to 8. Here throughput is defined as the ratio of correctly decoded blocks to the total transmitted blocks including re-transmitted blocks.

In BLER corresponding to the through put results shown here which indicate that both the proposed scheme and the sparse scheme have a BLER of zero (when averaging is done over 2000 blocks) for SNR>=−2 dB in the case of 3 dominant interferer while the MLS scheme has a non-zero BLER even for SNRs as high as 10 dB. In FIG. 16, for the EVA channel model, MLS based scheme require that each block is re-transmitted around 4 times for it to be correctly decoded at a SNR of 8 dB and to have BLER of 0.007. In the case of the proposed scheme only 25% of the blocks require retransmission and that too only one retransmission to obtain zero BLER and 100% throughput. Similar results can be seen in FIGS. 17 and 18 with the gap between the sparse and the proposed method decreasing as compared to FIG. 16.

Embodiments disclosed herein are applicable in systems such as the 3GPP LTE system and other similar systems which employ pilots/reference signal spanning the entire band in the frequency domain. Embodiments disclosed herein can also be used for wideband CQI estimation in systems employing standards such as IEEE 802.16m. Further the sparsity information provided by the embodiments disclosed herein can be used to provide power delay profile information to algorithms that extract the channel from dedicated pilots limited to a part of the frequency band. The proposed significant channel tap detection method is also applicable for detection of the CIR tap location in any general system given a coarse and over modeled estimate of the CIR.

The embodiments disclosed herein can be implemented through at least one software program running on at least one hardware device and performing network management functions to control the network elements. The network elements shown in FIG. X include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for estimating the Channel Impulse Response (CIR) for a received signal in a receiver in a communication system, said method comprising:
    computing a coarse channel estimate at pilot locations in said received signal;
    computing a channel power estimate using the computed coarse channel estimate;
    estimating a sum of interference power and a thermal noise variance;
    computing an optimal regularization term using said sum of interference power, said thermal noise variance, and said channel power estimate;
    computing an optimally regularized Modified Least Square (MLS) estimate using said optimal regularization term;
    computing a variance of noise in said regularized MLS estimate;
    identifying probable multipath tap locations in said received signal using said MLS estimate and said variance of noise in said regularized MLS estimate;
    classifying said probable multipath locations into significant multipath locations and locations with noise; and
    estimating the CIR using said significant multipath locations.

2. The method as claimed in claim 1, wherein said receiver comprises an Orthogonal Frequency Division Multiplexed (OFDM) based receiver.

3. The method as claimed in claim 1, wherein said receiver comprises at least one receiving antenna.

4. The method as claimed in claim 1, wherein said sum of interference power and said thermal noise variance is estimated using at least one of:
    a mean value of said coarse channel estimate;
    a trimmed mean value of said coarse channel estimate;
    a median variance of said channel estimate;
    a coarse channel estimate; or
    a combination of said mean value, said trimmed mean value, said median variance, and said coarse channel estimate.

5. The method as claimed in claim 1, wherein said optimal regularization term is based on a Bayesian regularization theory.

6. The method as claimed in claim 1, wherein said variance of noise in said regularized MLS estimate is computed using at least one of:
    a theoretical variance value of said regularized MLS estimate;
    a median variance value of said regularized MLS estimate;

a trimmed mean variance value of said regularized MLS estimate; or a combination of said theoretical variance value, said median variance value, and said trimmed mean variance value of said regularized MLS estimate.

7. The method as claimed in claim 1, wherein said receiver identifies said probable multipath tap locations using model order estimation methods.

8. The method as claimed in claim 1, wherein said receiver classifies said probable multipath locations into multipath locations and locations with noise using outlier detection theory.

9. The method as claimed in claim 1, wherein said receiver classifies said probable multipath locations into multipath locations and locations with noise using Extreme Value Theory (EVT).

10. The method as claimed in claim 1, wherein said probable multipath locations are classified into multipath locations and locations with noise using a function of the probability density function (pdf) of the maximum of m iid random variables to distinguish between significant taps and taps which contain only noise, wherein said m iid random variables pdf is a pdf of noise present in said optimally regularized MLS estimate.

11. The method as claimed in claim 1, wherein when said received signal comprising a low signal to interference ratio, said method further comprising:

fixing a first model order, wherein said first model order is less than an assumed model order used to compute said channel estimate; and retaining tap locations, wherein position of said retained tap locations is less than said first model order.

12. The method as claimed in claim 1, wherein when wideband pilots are present in said received signal, said method further comprising:

calculating a power delay profile from said regularized MLS estimate; and using said power delay profile while designing estimators which use narrowband pilots for other symbols in the same frame.

13. The method as claimed in claim 1, wherein said method is performed iteratively.

14. A receiver in a communication system, said receiver estimating a channel impulse response (CIR), and said receiver comprising at least one means adapted to:

compute a coarse channel estimate at pilot locations in said received signal;

compute a channel power estimate using said computed coarse channel estimate;

estimate a sum of interference power and a thermal noise variance;

compute an optimal regularization term using said sum of interference power and said thermal noise variance;

compute an optimally regularized Modified Least Square (MLS) estimate using said optimal regularization term;

compute a variance of noise in said regularized MLS estimate;

identify probable multipath tap locations in said received signal using said MLS estimate and said variance of noise in said regularized MLS estimate;

classify said probable multipath locations into significant multipath locations and locations with noise; and estimate the CIR using said significant multipath locations.

15. The receiver as claimed in claim 14, wherein said receiver comprises at least one receiving antenna.

16. The receiver as claimed in claim 14, wherein said receiver estimates said sum of interference power and said thermal noise variance using at least one of:

a mean variance value of said channel estimate;

a trimmed mean variance value of said channel estimate;

a median variance value of said channel estimate; or a combination of said mean variance, said trimmed mean variance value, and said median variance value.

17. The receiver as claimed in claim 14, wherein said receiver computes said optimal regularization term based on a Bayesian regularization theory.

18. The receiver as claimed in claim 14, wherein said receiver computes said variance of noise in said MLS estimate using at least one of:

theoretical variance value;

median variance value;

trimmed mean variance value; or a combination of theoretical variance, median variance and trimmed mean variance values.

19. The receiver as claimed in claim 14, wherein said receiver identifies said probable multipath tap locations using model order estimation methods.

20. The receiver as claimed in claim 14, wherein said receiver classifies said probable multipath locations into multipath locations and locations with noise using outlier detection theory.

21. The receiver as claimed in claim 14, wherein said receiver classifies said probable multipath locations into multipath locations and locations with noise using Extreme Value Theory (EVT).

22. The receiver as claimed in claim 14, wherein said receiver classifies said probable multipath locations into multipath locations and locations with noise using a function of a probability density function (pdf) of the maximum of m iid random variables to distinguish between significant taps and taps which contain only noise, wherein said m iid random variables are noise present in said optimally regularized MLS estimate.

23. The receiver as claimed in claim 14, wherein when said received signal comprises a low signal to interference ratio, said receiver further comprises at least one means configured to:

fix a first model order, wherein said first model order is less than an assumed model order used to compute said channel estimate; and retain tap locations, wherein position of said retained tap locations is less than said first model order.

24. The receiver as claimed in claim 14, wherein when wideband pilots are present in said received signal, said receiver further comprises at least one means configured to:

calculate a power delay profile from said regularized MLS estimate; and use said power delay profile while designing estimators which use narrowband pilots for other symbols in the same frame.

25. The receiver as claimed in claim 14, wherein said receiver performs said steps iteratively.

26. A method for estimating a Channel Impulse Response (CIR) for a received signal in a receiver in a communication system, said method comprising:

computing a coarse channel estimate for said received signal;

finding a function of noise in said coarse channel estimate;

detecting locations of significant taps in said coarse channel estimate using outlier detection theory;

treating said significant taps as outliers with respect to noise values; and estimating said CIR using the detected significant tap locations.

27. The method as claimed in claim 26, wherein said function of noise comprises one of:
   a variance of said noise;
   a dispersion of said noise; or
   a probability density function (pdf) of said noise.

28. The method as claimed in claim 26, wherein said function of noise is calculated using at least one of:
   a median variance value of said channel estimate;
   a trimmed mean variance value of said channel estimate;
   a maximum likelihood estimator of the function of said noise;
   a M estimator of function of said noise;
   a maximum likelihood estimator of variance of said noise; or
   a maximum likelihood estimator of dispersion of said noise.

29. The method as claimed in claim 26, wherein when wideband pilots are present in said received signal, said method further comprising:
   calculating a power delay profile from said regularized MLS estimate; and
   using said power delay profile while designing estimators which use narrowband pilots for other symbols in the same frame.

30. A receiver in a communication system, said receiver estimating a channel impulse response (CIR), and said receiver further comprising at least one means adapted to:
   compute a coarse channel estimate for said received signal;
   find a function of noise in said coarse channel estimate;
   detect locations of significant taps in said coarse channel estimate using outlier detection theory;
   treat said significant taps as outliers with respect to the noise values; and
   estimate said CIR using the detected significant tap locations.

31. The receiver as claimed in claim 30, wherein said receiver calculates said function of noise using at least one of:
   a median variance value of said channel estimate;
   a trimmed mean variance value of said channel estimate;
   a maximum likelihood estimator of the function of said noise;
   a M estimator of said function of said noise;
   a maximum likelihood estimator of variance of said noise; or
   a maximum likelihood estimator of dispersion of said noise.

32. The receiver as claimed in claim 30, wherein when wideband pilots are present in said received signal, said receiver further comprises at least one means configured to:
   calculate a power delay profile from said regularized MLS estimate; and
   use said power delay profile while designing estimators which use narrowband pilots for other symbols in the same frame.

33. A method for estimating a Channel Impulse Response (CIR) for a received signal in a receiver in a communication system, said method comprising:
   computing a coarse channel estimate for said received signal;
   finding a function of noise in said coarse channel estimate;
   detecting locations of significant taps in said coarse channel estimate using Extreme Value Theory (EVT); and
   estimating said CIR using the detected significant tap locations.

34. The method as claimed in claim 33, wherein said function of noise comprises at least one of:
   a variance of said noise;
   a dispersion of said noise;
   a function of the tail behavior of said noise;
   a shape parameter of said noise;
   parameters defining a probability density function (pdf) of said noise; or
   parameters defining the pdf of a maximum of m iid realizations of said noise.

35. The method as claimed in claim 33, wherein said function of noise is calculated using at least one of:
   a median variance value of said channel estimate; or
   a trimmed mean variance value of said channel estimate;
   a maximum likelihood estimator for parameters defining a probability density function (pdf) of said noise;
   a M estimator for the parameters defining said pdf;
   a maximum likelihood estimator for the parameters defining the pdf of a maximum of m iid realizations of said noise; and
   a M estimator for parameters defining said pdf of the maximum of m iid realizations of said noise.

36. The method as claimed in claim 33, wherein locations of said significant taps are detected by applying EVT to distinguish between large values in said coarse channel estimate which are due to noise and interference and those which are due to significant tap locations.

37. The method as claimed in claim 33, wherein detecting locations of said significant taps in said coarse channel estimate using EVT further comprises:
   computing a function based on an extreme value distribution of noise in said coarse channel estimate;
   comparing a value of said function at each tap location of the coarse channel estimate with respect to a threshold value; and
   retaining tap locations where a value of said function exceeds a threshold value.

38. The method as claimed in claim 33, wherein a cumulative density function of the maxima of m noise values are used to distinguish between significant channel taps and noise, where m is chosen at the receiver and all threshold values are user defined.

39. The method as claimed in claim 33, wherein when wideband pilots are present in said received signal, said method further comprising:
   calculating a power delay profile from said regularized MLS estimate; and
   using said power delay profile while designing estimators which use narrowband pilots for other symbols in the same frame.

40. A receiver in a communication system, said receiver estimating a channel impulse response (CIR), and said receiver further comprising at least one means adapted to:
   compute a coarse channel estimate for said received signal;
   find a function of noise in said coarse channel estimate;
   detect locations of significant taps in said coarse channel estimate using Extreme Value Theory (EVT); and
   estimate said CIR using the detected significant tap locations.

41. The receiver as claimed in claim 40, wherein said receiver calculates said function of noise using at least one of:
   a median variance value of said channel estimate; or
   a trimmed mean variance value of said channel estimate;
   a maximum likelihood estimator for the parameters defining a probability density function (pdf) of said noise;
   a M estimator for the parameters defining said pdf;

a maximum likelihood estimator for the parameters defining the pdf of the maximum of m iid realizations of said noise; and a M estimator for parameters defining said pdf of the maximum of m iid realizations of said noise.

42. The receiver as claimed in claim 40, wherein said receiver detects locations of said significant taps by applying EVT to distinguish between large values in said coarse channel estimate which are due to noise and interference and those which are due to significant tap locations.

43. The receiver as claimed in claim 40, wherein for detecting locations of said significant taps in said coarse channel estimate using EVT, said receiver further comprises at least one means configured to:

compute a function based on an extreme value distribution of noise in said coarse channel estimate;

compare a value of said function at each tap location of the coarse channel estimate with respect to a threshold value; and retain tap locations where a value of said function exceeds a threshold value.

44. The receiver as claimed in claim 40, wherein said receiver uses a cumulative density function of the maxima of m noise values to distinguish between significant channel taps and noise, where m is chosen at the receiver and all threshold values are user defined.

45. The receiver as claimed in claim 40, when wideband pilots are present in said received signal, said receiver further comprises at least one means configured to:

calculate a power delay profile from said regularized MLS estimate; and use said power delay profile while designing estimators which use narrowband pilots for other symbols in the same frame.

* * * * *